United States Patent [19]
Kanai et al.

[11] Patent Number: 5,737,036
[45] Date of Patent: Apr. 7, 1998

[54] COLOR IMAGE DISPLAY APPARATUS

[75] Inventors: Akira Kanai; Masaki Yamakawa; Junya Takahashi, all of Kyoto, Japan

[73] Assignee: Mitsubishi Denki Kabushiki Kaisha, Tokyo, Japan

[21] Appl. No.: 522,100

[22] Filed: Aug. 31, 1995

[30] Foreign Application Priority Data

Feb. 22, 1995 [JP] Japan ................................ 7-033831

[51] Int. Cl.⁶ ..................................... H04N 9/31
[52] U.S. Cl. ................................................ 348/742
[58] Field of Search ............................ 345/150, 154, 345/151; 348/567, 445, 566, 565, 742, 743, 761; 349/8

[56] References Cited

U.S. PATENT DOCUMENTS

| | | | |
|---|---|---|---|
| 4,305,092 | 12/1981 | Katzfey | 348/776 |
| 4,651,209 | 3/1987 | Okada et al. | 348/447 |
| 4,875,091 | 10/1989 | Yamada et al. | 348/269 |
| 4,907,862 | 3/1990 | Suntola | 349/61 |
| 5,049,994 | 9/1991 | Nakamura | 348/448 |
| 5,103,301 | 4/1992 | Cosentino | 348/217 |
| 5,172,221 | 12/1992 | Ko | 348/761 |
| 5,278,652 | 1/1994 | Urbanus et al. | 348/571 |
| 5,406,299 | 4/1995 | Post | 345/3 |
| 5,448,314 | 9/1995 | Heimbuch et al. | 348/743 |
| 5,485,217 | 1/1996 | Park | 348/445 |
| 5,528,262 | 6/1996 | McDowall et al. | 348/151 |
| 5,528,317 | 6/1996 | Gove et al. | 348/743 |
| 5,534,949 | 7/1996 | Baron | 348/742 |
| 5,565,933 | 10/1996 | Reinsch | 348/742 |
| 5,574,516 | 11/1996 | Kanai et al. | 348/742 |
| 5,592,238 | 1/1997 | Ogino et al. | 348/744 |

OTHER PUBLICATIONS

Fink "Electronics Engineers' Handbook" McGraw–Hill pp. 20–42 and 20–43, Dec. 1975.
IEEE Transactions on Consumer Electronic, vol. 39, No. 3, pp. 474–481, Aug. 1993.

*Primary Examiner*—Mark R. Powell

[57] ABSTRACT

A color image display apparatus utilizing a field sequential signal displays a picture normally without disturbance or deteriorating vertical resolution even when displaying an interlace image signal. The color image display apparatus is formed by a field sequential signal generator for converting a primary color signal to be interlaced into a field sequential signal, a monochrome image display apparatus for sequentially displaying a converted field sequential signal, a color apparatus 5 disposed to face a display screen of the monochrome image display apparatus to color a field sequential signal displayed on the display screen, and a control circuit for controlling timing of operations of these elements. A field judging result is supplied to the control circuit, and the control circuit operates so that a horizontal synchronizing signal of the field sequential signal is outputted continuously in a constant cycle even when an image signal to be interlaced is inputted. Even when displaying an interlace image signal, the color image display apparatus does not cause a picture disturbance or a brightness variation. The color image display apparatus outputs an excellent picture and is manufactured at a reduced cost.

12 Claims, 30 Drawing Sheets

DISPLAYED ONE LINE SHIFTED BELOW

CRT METHOD

COLOR FILTER METHOD

COLOR IMAGE DISPLAY APPARATUS

BACKGROUND OF THE INVENTION

1. Field of the Invention

The present invention relates to a color image display apparatus which converts an original color signal which is to be scanned by interlace scanning into a field sequential signal, displays the field sequential signal on a display screen of a monochrome picture display apparatus such as a black and white cathode ray tube, colors the monochrome picture by means of a coloring apparatus such as a color filter which is disposed at a faced position and displays a color picture.

2. Description of the Background Art

An example of a structure and an operation of a conventional color image display apparatus will be described.

FIG. 18 is a schematic diagram showing a structure of a conventional color image display apparatus which uses a field sequential signal according to a first conventional technique.

FIG. 18 illustrates a field sequential signal generator 1, a reference clock generating circuit 2 which generates a reference clock which is supplied to a control circuit 35 which controls the field sequential signal generator 1, a monochrome image display apparatus 4 which displays an output from the field sequential signal generator 1, and a coloring apparatus 5 which colors a picture which is displayed by the monochrome image display apparatus 4.

FIG. 19 illustrates a structure of the field sequential signal generator 1 according to the first conventional technique.

FIG. 19 illustrates an A/D conversion device 6 which is formed by A/D converters 6R, 6G and 6B which convert color signals R, G and B, respectively, into digital data. Memory unit 7 includes a memory 7R for storing data obtained by A/D converter 6R, memories 7G and 7G' for storing data obtained by A/D converter 6G and a memory 7B for storing data obtained by A/D converter 6B. D/A conversion device at 8 includes D/A convertors 8R, 8G, 8G' and 8B which convert data read from the memories 7R, 7G, 7G' and 7B into analog signals. Memory device 10 includes the A/D conversion device 6, the memory unit 7 and D/A conversion means device 8.

Switching device switches output signals from the D/A convertors 8R, 8G, 8G' and 8B, i.e., outputs from the memory device 10, in accordance with an RGB selection signals S.

Memories used in the memory unit 7 are dual-port memories which in general can write and read at the same time.

FIG. 20 illustrates the reference clock generating circuit 2 according to the first conventional technique.

In FIG. 20, a voltage controlled oscillator (hereinafter "VCO") 30 oscillates in accordance with a phase comparison output voltage PC from a phase comparator 29 and outputs a reference clock CK being 909 fH in frequency, and a frequency conversion circuit is denoted at 33 which frequency-divides the reference clock CK and outputs frequency-divided clock PLLH. In the first conventional technique, the reference clock CK is frequency-divided 909 times, i.e. the clock PLLH has 1/909 times frequency of the reference clock CK.

The phase comparator 29 compares the phase of an output PLLH from the frequency conversion circuit 33 with the phase of a horizontal synchronizing signal HD of a color signal which is supplied to the field sequential signal generator 1, converts a phase difference between the two phases into a voltage and outputs the voltage.

The reference clock generating circuit 2 includes VCO 30, the frequency conversion circuit 33 and the phase comparator 29. The reference clock generating circuit 2 performs a PLL (phase locked loop) operation to generate the reference clock CK which is synchronized with the horizontal synchronizing signal HD.

FIG. 21 illustrates the control circuit 35 of FIG. 18 according to the first conventional technique.

In FIG. 21, a horizontal frequency conversion circuit 11 converts the horizontal synchronizing signal HD into a signal which has a threefold higher frequency, and a vertical frequency conversion circuit 12 converts a vertical synchronizing signal VD into a signal which has a threefold higher frequency. A write control circuit 36 outputs an A/D clock ADC which controls write timing into the field sequential signal generator 1 of FIG. 18. A read control circuit 37 outputs a D/A clock DAC which controls read timing from the field sequential signal generator 1.

A display apparatus control circuit 16 controls a monochrome image display apparatus such as a CRT. A coloring apparatus control circuit 17 controls the coloring apparatus 5 so that the coloring apparatus 5 colors the field sequential signal with the same color under a controlled condition.

The control circuit 35 includes the horizontal frequency conversion circuit 11, the vertical frequency conversion circuit 12, the write control circuit 36, the read control circuit 37, the display apparatus control circuit 16 and the coloring apparatus control circuit 17.

FIG. 22 shows the monochrome image display apparatus 4 of the first conventional technique as it is formed using a black and white cathode ray tube (CRT).

In FIG. 22, the monochrome image display apparatus 4 which displays a field sequential RGB signal M includes a deflection control circuit 39 and a CRT 38. Receiving a horizontal control signal HS and a vertical control signal VS from the control circuit 35, the deflection control circuit 39 generates a horizontal deflection pulse HP and a vertical deflection pulse VP. The CRT 38 is deflected in accordance with the horizontal deflection pulse HP and the vertical deflection pulse VP. The deflection control circuit 39 which is commonly used in a CRT includes an AFC circuit.

FIG. 23 shows the coloring apparatus 5 of the first conventional technique using a color filter.

In FIG. 23, a motor control circuit 42 receives a coloring control signal CS and outputs a motor control signal MS which controls a motor. In response to the motor control signal MS, a motor 41 rotates a color filter 40 which is formed by filters for a plurality of primary color signals in front of the display screen of the monochrome image display apparatus so that the filter of one of the primary colors is synchronized with the field sequential RGB signal.

FIGS. 24A to 24C are explanatory diagrams regarding the timing of the control signals which are used in the field sequential signal generator 1 of the first conventional technique.

FIG. 24A shows the timing of the signals which are related to a vertical synchronizing period. FIG. 24A shows the timing of signals WE and WE' of a plurality of write control signals W, the timing of signals RE and RE' of a plurality of read control signals R and the timing of a plurality of RGB selection signals SR, SG, SG' and SB in relation to the vertical synchronizing signal VD.

FIG. 24B shows the timing of the signals which are related to a horizontal synchronizing period. FIG. 24B shows the timing of the horizontal synchronizing signal HD and the timing of the reference clock CK. The number of the reference clock supplied during one cycle of the horizontal synchronizing signal is 909.

FIG. 24C shows the timing of signals which are related to the reference clock, i.e., the timing of the A/D clock ADC and the D/A clock DAC in relation to the reference clock CK. It can be seen that the reference clock CK and the D/A clock DAC are clocks having the same frequency and the frequency of the A/D clock ADC is ⅓ of the frequencies of the reference clock CK and the D/A clock DAC.

FIGS. 25A and 25B are explanatory diagrams showing how each field is displayed on the screen of the monochrome image display apparatus 4 in the first conventional technique.

FIG. 25A shows the screen as it displays a television picture while FIG. 25B shows the screen as it displays the field sequential signal RGB used in the first conventional technique.

In the first conventional technique, image signals of three fields are displayed (FIG. 25B) while one field of a regular television picture of FIG. 25A is displayed. The image signals of FIG. 25B are equivalent to the image signal of FIG. 25A as it is colored in the three primary colors of red, blue and green.

The image signals of FIG. 25B are displayed at a speed three times faster than a speed at which the image signal is displayed in FIG. 25A. This is possible by separating the television image signal into three-primary color signals, storing the three-primary color signals in memories and reading the three-primary color signals at a speed three times faster.

In general, a dual-port memory is used to store an image signal. Since this type of memory can read and write at the same time, it is possible to read an image signal while writing an image signal.

However, when this type of memory is used in a conventional system in which an image signal is read three times faster than when it is written as described above, writing goes ahead of reading. That is, "passing" occurs.

When image signals are read at a speed three times faster, at exactly the center of the field, an image signal read switches from a currently written image signal to a previous image signal.

To prevent a picture of an image signal from switching in the same one field, an additional memory is conventionally used for a color signal associated with passing, and writing reading are alternately performed.

For instance, since passing occurs for the color signal G when the color signals R, G and B are read in this order from the vertical synchronizing signal, a passing memory 7G' is additionally disposed as shown in FIG. 19.

FIG. 26 is a view showing writing into each memory of the memory unit 7 in the first conventional technique.

In FIG. 26, the memory resets writing in response to the control signal which is synchronized with the vertical synchronizing signal VD. Writing and reading are performed in accordance with the number of the clocks supplied independently of the horizontal synchronizing signal.

FIG. 27 is an explanatory diagram for describing a relationship between the field phase of an interlace signal (NTSC signal), the field phase of the field sequential signal read from the memories and vertical scanning.

FIG. 28 is an explanatory diagram showing an example of a picture displaying interlacing signals in the first conventional technique.

Now, a operation in the first conventional technique will be described.

As shown in FIGS. 18 and 19, the color signals R, G and B are supplied to the field sequential signal generator i and stored in the memory device 10 under the control of the respective control signals which are outputted from the control circuit 35. Within the memory device 10, the color signals R, G and B are converted into digital data by the associated A/D convertors 6R, 6G and 6B, respectively, in synchronization with the A/D clock ADC.

In accordance with the A/D clock ADC, the digital data converted by the A/D convertor 6R is written and stored in the memory 7R, the digital data converted by the A/D convertor 6G in the memory 7G, and the digital data converted by the A/D convertor 6B in the memory 7B.

Next, the stored data are read with the D/A clock DAC which is three times faster than the writing speed. The D/A convertors 8R, 8G, 8G' and 8B convert the digital data read from the memories into analog signals in accordance with the D/A clock DAC.

At the memory 7G, since writing and reading are performed at the same time, passing occurs between a written address and a reading address.

During triple speed reading, passing occurs near the center within the memory G. When passing occurs, a picture is not correctly displayed. In reality, this occurs only with a green color signal. To human eyes, a picture appears with a line running the center on the screen. To prevent passing, the passing memory 7G' is additionally disposed only for the color signal G in the first conventional technique.

The control circuit 35 for outputting the control signals is realized by the reference clock CK which is outputted by the reference clock generating circuit 2.

When a clock which is used as the reference clock for the control circuit becomes irregular, writing into the memories and reading from the memories become irregular and triple speed reading cannot be normally and stably performed.

To deal with this, as shown in FIG. 20, the reference clock generating circuit 2 includes a PLL circuit which is controlled by the horizontal synchronizing signal HD. With such a structure, the reference clock generating circuit 2 outputs a stable reference clock which has a constant clock number per horizontal synchronizing period.

Although the horizontal synchronizing signal HD which is used to reproduce a video picture or the like includes a little jittering, the frequency of the horizontal synchronizing signal does not change largely in the reference clock generating circuit 2 which is formed by a PLL circuit.

However, the frequency of the horizontal synchronizing signal HD which is used with a non-interlace signal changes more than that used with a interlace signal. Horizontal synchronizing frequencies are different between in the interlace and non-interlace signals. The oscillation frequencies in the VCO 30 are, therefore, so much different under the same frequency-dividing ratio that the VCO 30 hardly follows the signal HD in the non-interlace signal. The frequency-dividing ratio is unchangeable at the view point of an image resolution. As a result, the reference clock generating circuit 2 does not operate normally any more, which leads the control circuit to malfunction.

The memory device 10 constructed as shown in FIG. 19 requires three A/D convertors to form the A/D conversion device 6, four memories to form the memory unit 7 and four D/A convertors to form the D/A conversion device 8.

Since A/D convertors and memories, in particular are expensive, a cost to form the memory device 10 accounts for a large portion in the entire cost which is needed to manufacture the color image display apparatus. Thus, the system as a whole is expensive.

Signals are written in and read from the memories of FIG. 19 successively in a manner as shown in FIG. 26. Since the reference clock is controlled to have a constant clock number per horizontal synchronizing period as described above, while writing and reading from the memories 7 are performed successively, image signals are read without punctuating synchronization. From the memory device 10, signals are outputted at a speed three times faster than when the signals R, G and B are inputted to the memory device 10. The signals outputted from the memory device 10 at such a triple speed are switched by the switching device 9 in an order every ⅓ period of the vertical synchronizing signal of the original signals R, G and B.

As shown in FIGS. 24A to 24C, this operation is controlled by the RGB selection signals S which are supplied from the control circuit 35 (The symbol S expresses a plurality of signals.). An output form the switching device is supplied to the monochrome image display apparatus 4 as the field sequential RGB signal M.

The monochrome image display apparatus 4 is formed by the CRT 38 and the deflection control circuit 39 as shown in FIG. 22. For vertical and horizontal deflection, a deflection pulse is used whose speed is three times faster than a regular television pulse. The deflection control circuit 39 operates so that a picture is displayed by the CRT 38 at a speed three times faster than a regular display speed. The color filter 40 is rotated in front of the display screen of the CRT 38 as shown in FIG. 23. Rotation of the color filter 40 is controlled by the motor control circuit 42 in such a manner that the filter of the same color comes in front of the display screen in synchronization with the primary color signals of the field sequential RGB signal M. A black and white picture displayed on the display screen is colored by the color filter 40 and displayed at a speed three times faster than a regular display speed. One field of each one of the three color signals red, green and blue is displayed in one field period.

When viewed by human eyes, the picture passed through the color filter 40 appears as a color picture in which the three colors are synthesized.

As shown in FIG. 27, when a primary color signal performing interlacing such as an NTSC signal is used in this color image display apparatus, a signal is outputted independently of a field during reading. Hence, there is a time at which a horizontal synchronizing signal having a triple speed is outputted with half its cycle, which renders outputting of the horizontal synchronizing signal discontinuous. This also renders horizontal deflection using the horizontal control signal HS discontinuous.

When a picture is displayed on the CRT 38, for instance, since the horizontal synchronizing signal is controlled to appear at equal intervals by a horizontal deflection AFC (automatic frequency control) circuit which is disposed within the deflection control circuit 39, the displayed picture may be distorted due a deviation of the horizontal synchronizing frequency.

Further, since the horizontal control signal HS used as a signal for generating a high voltage for the CRT 38 is not continuous, a stable voltage is not output. Hence, the brightness changes.

Still further, as shown in FIG. 28, since the signal G(O) is a signal of the second (even-numbered) field while the triple speed horizontal synchronizing signal is synchronized with the triple speed vertical synchronizing signal in reality, a displayed picture is a picture of the first (odd-numbered) field.

Thus, since a field which is actually displayed and a field in which the signal was stored are different from each other, the order of lines is changed.

Hence, a vertical resolution is deteriorated when an interlace signal is displayed.

As described above, when an interlace signal is supplied to the color image display apparatus of the first conventional technique, a picture on the screen is disturbed, the brightness on the screen changes, the vertical resolution is deteriorated or other problems are created.

Now, an example of a structure and an operation of a color image display apparatus according to a second conventional technique will be described.

In drawings referred to, the elements similar or corresponding to those used in the first conventional technique are denoted by similar or corresponding reference signs and will not be described in detail.

FIG. 29 is a schematic diagram showing a structure of the color image display apparatus of the second conventional technique which receives primary color signals red (R), green (G) and blue (B) behaving as an interlace signal and which requires a horizontal synchronizing signal to be continuous.

FIG. 29 illustrates field sequential signal generator 43 which is structured to solve a problem such as a deteriorated vertical resolution, malfunction of the AFC and passing which is created when an interlace signal is displayed. Reference clock generating circuit 2 generates a reference clock which is to be supplied to a control circuit 44 which controls the field sequential signal generator 43. Monochrome image display apparatus which displays an output from the field sequential signal generator 43. Coloring apparatus 5 colors a picture displayed by the monochrome image display apparatus 4.

FIG. 30 is a diagram showing a structure of the field sequential signal generator 43 of the second conventional technique.

In FIG. 30, A/D convertors 60R and 60R' convert a signal R into digital data, A/D convertors 60G and 60G' convert a signal G into digital data, and A/D convertors 60B and 60B' convert a signal B into digital data. These A/D convertors form A/D conversion device 60.

Denoted at 70R, 70R', 70G, 70G', 70B and 70B' are memories for storing digital data from the A/D convertors 60R, 60R', 60G, 60G', 60B and 60B', respectively. These memories form memory unit 70.

Denoted at 80R, 80R', 80G, 80G', 80B and 80B' are D/A convertors for converting data read from the memories 70R, 70R', 70G, 70G', 70B and 70B', respectively, into analog signals. These D/A convertors form D/A conversion device 80.

A switching device 90 switches output signals from the D/A convertors of a memory device 45 which is formed by the A/D conversion device 60, the memory unit 70 and the D/A conversion device 80.

Portions denoted at signs with a dash in FIG. 30 are signals and elements associated with one of the two memories of each memory pair which is assigned to an alternate field. These are additionally disposed to prevent the problems of passing and interlacing.

FIG. 31 shows a structure of the control circuit 44 of the second conventional technique. Read control circuit 46 reads signals which are stored in the memories of one pair alternately for each field so that the horizontal synchronizing signal becomes continuous. The control circuit 44 is formed by the horizontal frequency conversion circuit 11, the vertical frequency conversion circuit 12, the write control circuit 36, the read control circuit 46, the display apparatus control circuit 16 and the coloring apparatus control circuit 17.

FIGS. 32A to 32C are explanatory diagrams showing the timing of the respective control signals which are used in the field sequential signal generator 43 of the second conventional technique.

FIG. 32A shows timing of the signals which are related to a vertical synchronizing period. FIG. 32A shows timing of signals WE and WE' of a plurality of write control signals W and W', the timing of signals RE and RE' of a plurality of read control signals R and R' and the timing of signals SR, SG, SG' and SB of a plurality of RGB selection signals S and S' in relation to the vertical synchronizing signal VD.

Now, the operation in the second conventional technique having the structure as above will be described.

The apparatus of the second conventional technique is constructed to deal with the problem of interlacing which occurs in the first conventional technique. Hence, the problem of interlacing does not occur in the second conventional technique.

As shown in FIG. 29, although similar in structure to the first conventional technique, the second conventional technique requires different signals to be outputted from the field sequential signal generator 43 and the control circuit 44.

That is, the field sequential signal generator 43 of the second conventional technique shown in FIG. 30 includes two A/D convertors, two memories and two D/A convertors for each one of the primary color signals R, G and B to write and read in and from the two memories alternately for each one of the primary color signals R, G and B. Writing and reading of the primary color signals R, G and B are controlled by the plurality of the write control signals W and W' and the plurality of the read control signals R and R'. The primary color signals R, G and B are alternatively written in the memories for each field, and read at a speed three times faster than a regular writing speed. The primary color signals are read so that the horizontal synchronizing signal appears continuous and at equal intervals and so that passing does not occur. By switching the triple speed primary color signals by the switching device 90, the field sequential RGB signal M with which the horizontal synchronizing signal HD is continuous and which does not cause passing is obtained at the controlled timing shown in FIGS. 32A to 32C.

FIG. 32A shows the conditions of the signals which change during the vertical synchronizing period. Among other write control signals, the write control signals WE and WE' allow the memories to write alternatively in synchronization with the vertical synchronizing signal VD. Among other read control signals, the read control signals RE and RE' cause reading from the memories which are disposed for the color signals R, G and B in synchronization with the vertical synchronizing signal VD. The plurality of RGB selection signals S switch the signals R, G and B in this order for each one of the alternating fields in synchronization with the vertical synchronizing signal VD.

The timing shown in FIGS. 32B and 32C is the same as that shown in FIGS. 24B and 24C, and therefore, the operation regarding FIGS. 32B and 32C is the same as the operation regarding FIGS. 24B and 24C.

The reference clock generating circuit 2, the monochrome image display apparatus 4 and the coloring apparatus 5 operate in the same manner as in the first conventional technique.

Thus, a color image display apparatus which displays an interlace signal is realized.

Since the horizontal synchronizing signal continuously outputted at equal intervals in the structure above under the control as above, a stable picture is displayed without the problems such as disturbance on the screen due to AFC and a change in a high voltage.

Further, since a picture is displayed exactly at the same position, interlacing is possible.

However, while one picture is synthesized by each field in the first conventional technique, two pictures are synthesized during a period of two fields.

As described above, although the second conventional technique solves the problems such as "a disturbed picture," "a change in the brightness" and "a deteriorated vertical resolution" which occur in the first conventional technique when an interlace signal is displayed, the apparatus of the second conventional technique is expensive since the field sequential signal generator 43 requires two A/D convertors, two memories and two D/A convertors for each one of the primary color signals R, G and B.

In the color image display apparatus of the first conventional technique having the structure as above, the cycle of the horizontal synchronizing signal becomes shorter or longer instead of staying constant when an image signal for interlacing is displayed. Hence, the deflection control circuit of the monochrome image display apparatus fails to receive the horizontal synchronizing signal continuously at equal intervals, whereby the AFC circuit malfunctions and a picture displayed on the screen is disturbed.

Further, due to malfunction of the AFC circuit, a voltage outputted from a fly back transducer for generating a high voltage becomes unstable, the brightness of the screen changes or the signal is read in a field which is different from a field in which the signal was stored and the vertical resolution is deteriorated.

Still further, when an image for which interlacing is not performed is inputted, since the cycle of the horizontal synchronizing signal is different, the reference clock generating circuit fails to operate normally to disturb the reference clock and hence a picture.

To use the memory device of the second conventional technique having the structure as above to solve these problems increases the number of the expensive memories, A/D convertors and other elements which are necessary, which increases a cost of manufacturing the color image display apparatus.

SUMMARY OF THE INVENTION

A color image display apparatus according to a first aspect of the present invention comprises: field sequential signal generating means which includes a memory device for storing one field of each one of a plurality of primary color signals which form one color image signal, the field sequential signal generating means receiving the plurality of primary color signals and reading the plurality of primary color signals which are stored in the memory device at a speed which is n times faster than a speed at which the plurality of primary color signals are stored in the memory device, whereby the plurality of primary color signals are converted into a field sequential signal; image displaying means for sequentially displaying the field sequential signal which is outputted from the field sequential signal generating means; coloring means disposed to face a display screen of the image displaying means, in synchronization with the field sequential signal which is sequentially displayed by the image displaying means, the coloring means coloring the field sequential signal in a color which corresponds to each one of the plurality of primary color signals which form the field sequential signal; reference clock generating means for generating a reference clock signal having a predetermined frequency in accordance with a horizontal synchronizing signal of the color image signal; and control means for controlling the field sequential signal generating means, the image displaying means and the coloring means in accordance with the horizontal synchronizing signal and a vertical synchronizing signal of the color image signal and in accordance with the reference clock which is outputted from the reference clock generating means so that the field sequential signal generating means, the image displaying means and the coloring means each operate at predetermined timing, wherein the control means controls the field sequential signal generating means so that a horizontal synchronizing signal of the field sequential signal which is outputted from the field sequential signal generating means, appears continuously in a constant cycle.

According to a second aspect of the present invention, in the color image display apparatus of the first aspect of the present invention, the control means includes a field judging circuit which receives the horizontal synchronizing signal and the vertical synchronizing signal and judges whether a field of the color image signal stored in the memory device of the field sequential signal generating means is an even-numbered field or an odd-numbered field in accordance with the horizontal synchronizing signal and the vertical synchronizing signal, and the control means controls the field sequential signal generating means in accordance with a field judging result yielded by the field judging circuit so that the horizontal synchronizing signal of the field sequential signal appears continuously in a constant cycle.

In the color image display apparatus of the second aspect of the present invention, the field judging circuit preferably judges a phase difference between the horizontal synchronizing signal and the vertical synchronizing signal to determine whether the field of the color image signal is an even-numbered field or an odd-numbered field.

According to a third aspect of the present invention, in the color image display apparatus of the first aspect of the present invention, the control means includes a memory which allots certain addresses to one line of a horizontal direction in advance, moves an address to a next predetermined address value in synchronization with the horizontal synchronizing signal even if the address is in the middle of a line and resets a memory address in synchronization with the vertical synchronizing signal, and therefore the memory can read and write at the same time.

According to a fourth aspect of the present invention, in the color image display apparatus of the first aspect of the present invention, the plurality of primary color signals which are supplied to the field sequential signal generating means are primary color signals of three primary colors of red, green and blue, and the number n is three.

According to a fifth aspect of the present invention, in the color image display apparatus of the second aspect of the present invention, the control means controls horizontal scanning by the image displaying means so that the image displaying means scans in a certain cycle of a speed n times faster and the control means controls a vertical scanning position on the image displaying means in accordance with the field judging result yielded by the field judging circuit so that a field of the field sequential signal which is displayed by the image displaying means coincides with a field of the color image signal stored in the memory device.

According to a sixth aspect of the present invention, in the color image display apparatus of the fifth aspect of the present invention, wherein the control means synchronizes a vertical scanning period of the image displaying means with the horizontal synchronizing signal having a speed n or n/2 times faster for each field in accordance with the field judging result yielded by the field judging circuit, whereby a field of the field sequential signal which is displayed by the image displaying means coincides with a field of the color image signal which is stored in the memory device.

According to a seventh aspect of the present invention, in the color image display apparatus of the sixth aspect of the present invention, the control means synchronizes a vertical scanning period of the image displaying means to the horizontal synchronizing signal having a speed n or n/2 times faster for each field in accordance with the field judging result yielded by the field judging circuit, whereby a field and a vertical scanning position of the field sequential signal which is displayed by the image displaying means coincide with a field and a vertical scanning position of the color image signal which is stored in the memory device, respectively.

According to an eighth aspect of the present invention, in the color image display apparatus of the seventh aspect of the present invention, when the color image signal is an NTSC signal, the control means controls the image displaying means so that the vertical scanning period of the image displaying means has a width of 263, 262.5, 263, 262, 262.5 and 262 where 1 is a horizontal period of n times faster as measured from a point where an odd-numbered field changes to an even-numbered field.

According to a ninth aspect of the present invention, in the color image display apparatus of the first aspect of the present invention, the control means further includes a non-interlace judging circuit which judges whether the plurality of primary color signals which are supplied to the field sequential signal generating means are interlace signals or non-interlace signals, the control means controls synchronizes vertical scanning timing of the image displaying means with the horizontal synchronizing signal when the plurality of primary color signals which are supplied to the field sequential signal generating means are non-interlace signals so that interlacing is not performed.

According to a tenth aspect of the present invention, in the color image display apparatus of the ninth aspect of the present invention, the control means controls the reference clock generating means so that the reference clock generating means outputs a reference clock signal which corresponds to the non-interlace signals when the non-interlace judging circuit detects the non-interlace signals.

According to an eleventh aspect of the present invention, in the color image display apparatus of the first aspect of the present invention, the reference clock generating means provides the control means with a horizontal reference signal for comparing frequency-converted horizontal synchronizing phases instead of supplying the horizontal synchronizing signal of the color image signal to the control means.

As described above, in the first aspect of the present invention, the control means controls the field sequential signal generating means so that the horizontal synchronizing signal of the field sequential signal outputted from the field sequential signal generating means appears continuously in constant cycles. This stabilizes an AFC operation within the image displaying means, preventing disturbance of a picture which is displayed by the image displaying means and a change in the brightness of the picture.

In the second aspect of the present invention, the control means further includes the field judging circuit which judges a field in which the signal was stored. Hence, the horizontal synchronizing signal of the field sequential signal which is outputted from the field sequential signal generating means always appears continuously in constant cycles even when the field changes, thereby preventing disturbance of a picture which is displayed by the image displaying means and a change in the brightness of the picture.

In the third aspect of the present invention, certain addresses are allotted to one line in a horizontal direction in each memory in advance. Writing and reading jump to a next predetermined address value in synchronization with the horizontal synchronizing signal even if the address is yet to reach a certain value in each memory. A memory address is reset in synchronization with the vertical synchronizing signal and writing and reading are performed. Hence, even if the number of the clocks for one horizontal line increases during writing or reading, only one more clock is read for the line, exerting no influence over the picture as a whole.

In the fourth aspect of the present invention, the plurality of primary color signals which are supplied to the field sequential signal generating means are primary color signals of three primary colors of red, green and blue. The reading speed n from the memory device is set as minimum n=3 which does not cause flicker. Hence, it is possible to obtain a color image of a practically sufficient quality from a color image signal which typically consists of three primary colors of red, green and blue in an inexpensive structure system.

In the fifth aspect of the present invention, the image displaying means is scanned in a horizontal direction in a certain cycle at an n-fold faster speed. The vertical scanning position on the image displaying means is controlled in accordance with the field judging result yielded by the field judging circuit so that a field of the field sequential signal which is displayed by the image displaying means coincides with a write field. Hence, an interlace signal is displayed normally with less deterioration of the vertical resolution.

In the sixth aspect of the present invention, the vertical scanning period of the image displaying means is synchronized with the horizontal synchronizing signal having a speed of n or n/2 times faster for each field in accordance with the field judging result which is yielded by the field judging circuit, whereby a field of the field sequential image signal displayed by the image displaying means coincides with a field used for writing. Hence, it is possible to normally and easily display an interlace image signal and reduce deterioration of the vertical resolution.

In the seventh aspect of the present invention, the vertical scanning period of the image displaying means is synchronized with the horizontal synchronizing signal having a speed of n or n/2 times faster for each field in accordance with the field judging result which is yielded by the field judging circuit, whereby a field of the field sequential image signal displayed by the image displaying means coincides with a field used for writing and the vertical scanning position is aligned. Hence, it is possible to align both the vertical scanning position and the field number of an interlace image signal. A deterioration of the vertical resolution is always prevented with an inexpensive structure.

In the eighth aspect of the present invention, when one color image signal is a primary color signal which is formed by an NTSC signal, scanning is performed so that the vertical scanning period of the image displaying means has a width of 263, 262.5, 263, 262, 262.5 and 262 where 1 is a horizontal period of n times faster as measured from a point where an odd-numbered field changes to an even-numbered field. Hence, it is possible to start displaying on the display screen at the same position for each field and to scan the same number of lines for each field. Thus, an interlace color image signal is displayed in an inexpensive structure while always preventing deterioration of the vertical resolution.

The ninth aspect of the present invention further uses the non-interlace judging circuit. When the interlace judging circuit judges that an inputted primary color signal is an non-interlace signal, the vertical scanning timing of the image displaying means is synchronized with the horizontal synchronizing signal so that an interlace operation is not performed. Hence, it is possible to display a stable picture even when an non-interlace signal is supplied to the color image display apparatus.

In the tenth aspect of the present invention, when the interlace judging circuit judges that an inputted primary color signal is an non-interlace signal, the reference clock generating means outputs a reference clock signal which corresponds to the non-interlace signal. Hence, it is possible to prevent unlocking of the reference clock signal and display even more stable picture even when an non-interlace signal is supplied to the color image display apparatus.

In the eleventh aspect of the present invention, the reference clock generating means provides the control means with a horizontal reference signal for comparing frequency-converted horizontal synchronizing phases instead of supplying the horizontal synchronizing signal of the color image signal to the control means. Hence, the horizontal reference signal is stable without jittering. It is possible to display a stable picture without deteriorating a horizontal resolution even when the color image display apparatus receives a signal for which horizontal synchronization is easily disturbed such as a video reproduction signal and a speed search signal.

Accordingly, it is an object of the present invention to obtain an inexpensive color image display apparatus which displays a stable, high quality picture without any disturbance, a change in the brightness and the like even when supplied with a signal such as an image signal needing interlacing and an interlace signal which is used in games and computers.

These and other objects, features, aspects and advantages of the present invention will become more apparent from the following detailed description of the present invention when taken in conjunction with the accompanying drawings.

DESCRIPTION OF THE PREFERRED EMBODIMENTS

In the following, similar or corresponding symbols and reference numbers are allotted to the similar or corresponding parts already described in relation to the conventional techniques, by which the similar or corresponding structure of preferred embodiments of the present invention is regarded as generally explained. Thus, a detailed description will be simply omitted for the similar or corresponding structure.

<First Preferred Embodiment>

Now, a first preferred embodiment will be described with reference to drawings.

Figure 1:
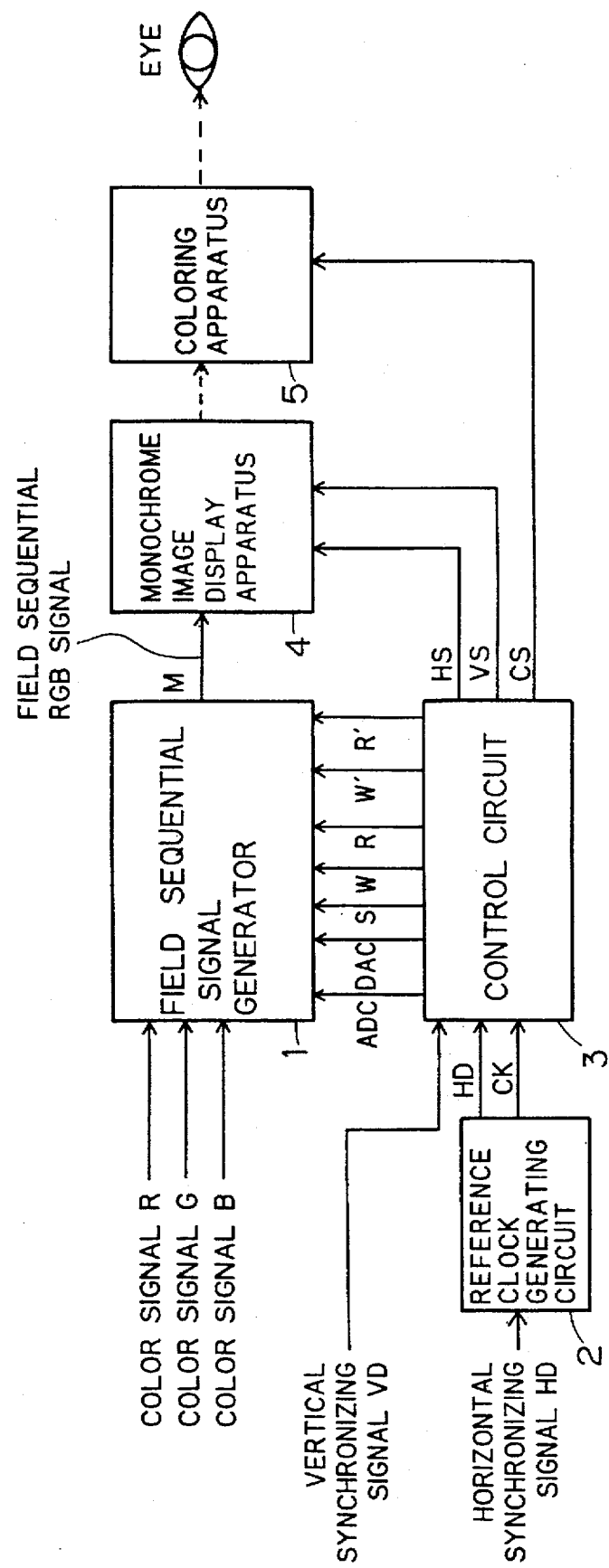
FIG. 1 is a schematic diagram showing a structure of a color image display apparatus which uses a field sequential signal according to a first preferred embodiment of the present invention.

FIG. 1 is a schematic diagram showing a structure of a color image display apparatus according to the first preferred embodiment of the present invention. FIG. 1, illustrates a field sequential signal generator 1, clock generating circuit, denoted at 3 is a control circuit, denoted at 4 is a monochrome image display apparatus 4 and a coloring apparatus 5.

Different from those used in the conventional techniques, the structure of the control circuit 3 is most characteristic of the first preferred embodiment.

The primary color signals R(red), G(green) and B(blue) supplied to the field sequential signal generator 1 are obtained by separating one interlace signal (color signals) into three primary colors.

Figure 2:
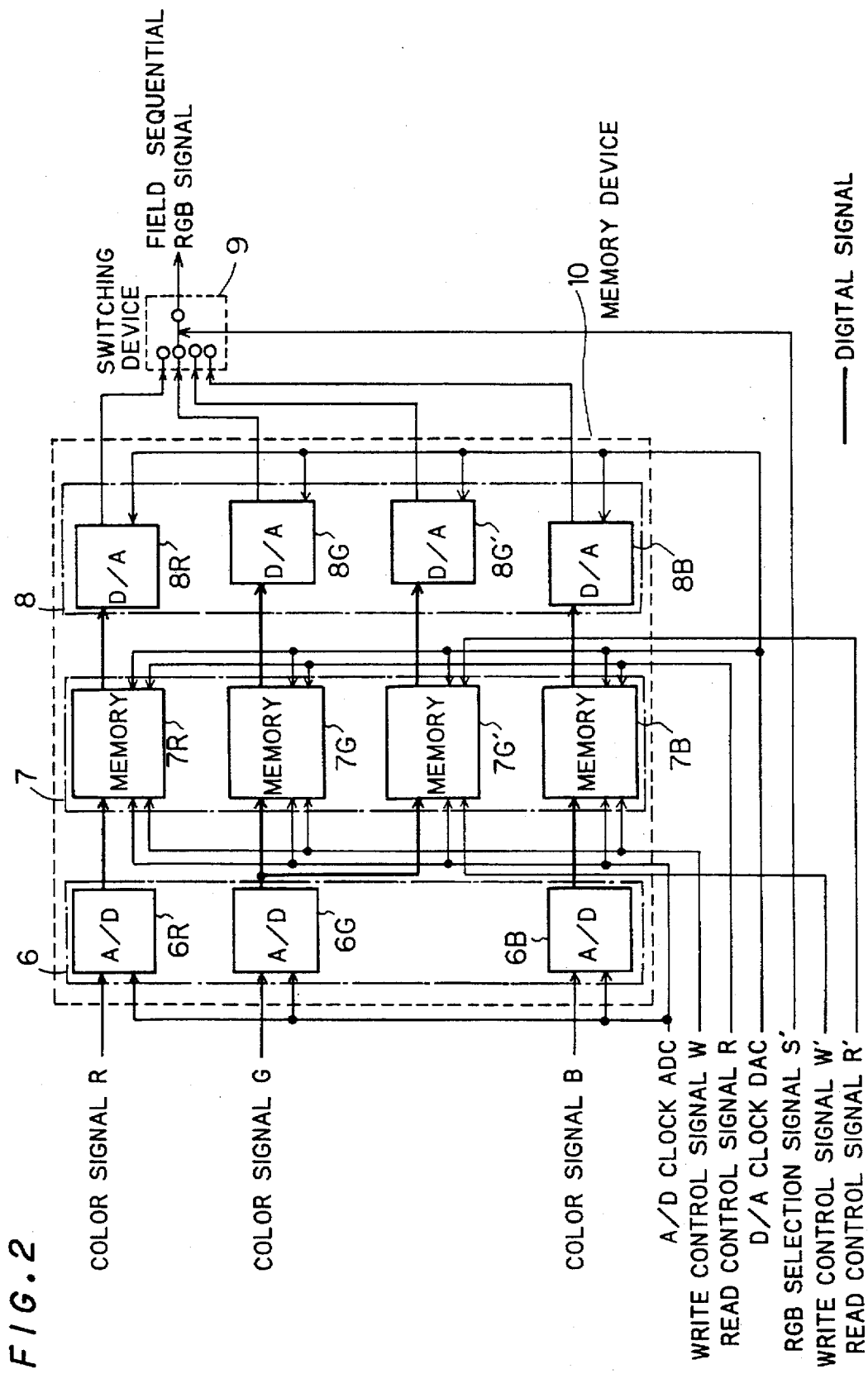
FIG. 2 is a view showing a structure of a field sequential signal generator used in the first preferred embodiment of the present invention.

FIG. 2 is a view showing a structure of the field sequential signal generator 1 used in the first preferred embodiment of the present invention. FIG. 2 illustrates A/D conversion device 6 which includes A/D convertors 6R, 6G and 6B for converting the supplied color signals R, G and B, respectively, into digital data. Memory unit 7 includes a memory 7R for storing data outputted from the A/D convertor 6R, memories 7G and 7G' for storing data outputted from the A/D converter 6G and a memory 7B for storing data outputted from the A/D converter 6B. D/A conversion device 8 includes D/A convertors 8R, 8G, 8G' and 8B for converting data read from the memories 7R, 7G, 7G' and 7B into analog signals. Memory device 10 includes the A/D conversion device 6, the memory unit 7 and the D/A conversion means 8.

Switching device 9 which switches output signals from the D/A convertors 8R, 8G, 8G' and 8B, i.e., outputs from the memory device 10, in accordance With RGB selection signals.

The supplied primary color signals R, G and B are converted into digital data by the A/D convertors 6R, 6G and 6B, respectively, stored in the memories 7R, 7G, 7G' and 7B in accordance with the write control signal W, and read at a speed three times faster in response to a read control signal as in the conventional techniques. The three primary color signals read from the memories at a speed three times faster are switched by the switching device 9 in accordance with the RGB selection signals S, and outputted as the field sequential RGB signal M, i.e., the output of the field sequential signal generator 1.

Unlike in the conventional techniques, memories used as the memories 7 are memories in which reading and writing can skip to an address position to a predetermined constant value in accordance with the horizontal synchronizing signal.

Figure 3:
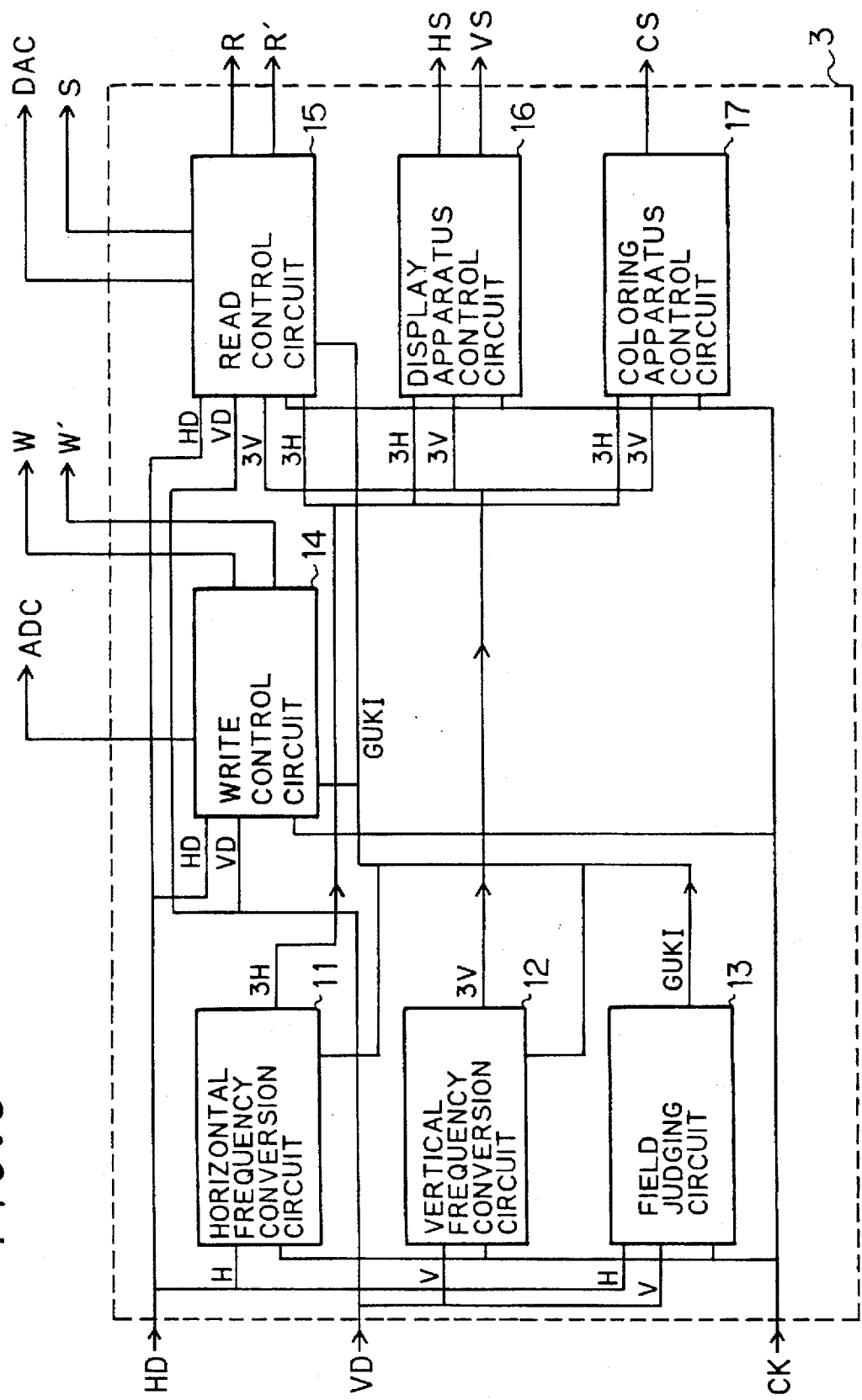
FIG. 3 is a view showing a structure of a control circuit of the first preferred embodiment used in the present invention.

FIG. 3 is a view showing a structure of the control circuit 3 used in the first preferred embodiment of the present invention.

In FIG. 3, a horizontal frequency conversion circuit 11 converts the horizontal synchronizing signal HD into a signal which has a threefold higher frequency, and a vertical frequency conversion circuit 12 converts the vertical synchronizing signal VD into a signal which has a threefold higher frequency. Field judging circuit 13 judges whether an interlace signal is in an even-numbered field or an odd-numbered field based on the vertical synchronizing signal VD and the horizontal synchronizing signal HD. A write control circuit 14 controls writing into the field sequential signal generator 1. A read control circuit 15 controls reading from the field sequential signal generator 1 so that the horizontal synchronizing signal of the field sequential signal is continuously outputted at equal intervals. A display apparatus control circuit 16 controls the monochrome image display apparatus 4 such as a CRT. The coloring apparatus control circuit 17 controls the coloring apparatus 5 so that the coloring apparatus 5 colors the field sequential signals with the same color. The control circuit 3 includes the horizontal frequency conversion circuit 11, the vertical frequency conversion circuit 12, the field judging circuit 13, the write control circuit 14, the read control circuit 15, the display apparatus control circuit 16 and the coloring apparatus control circuit 17.

Figure 4A:
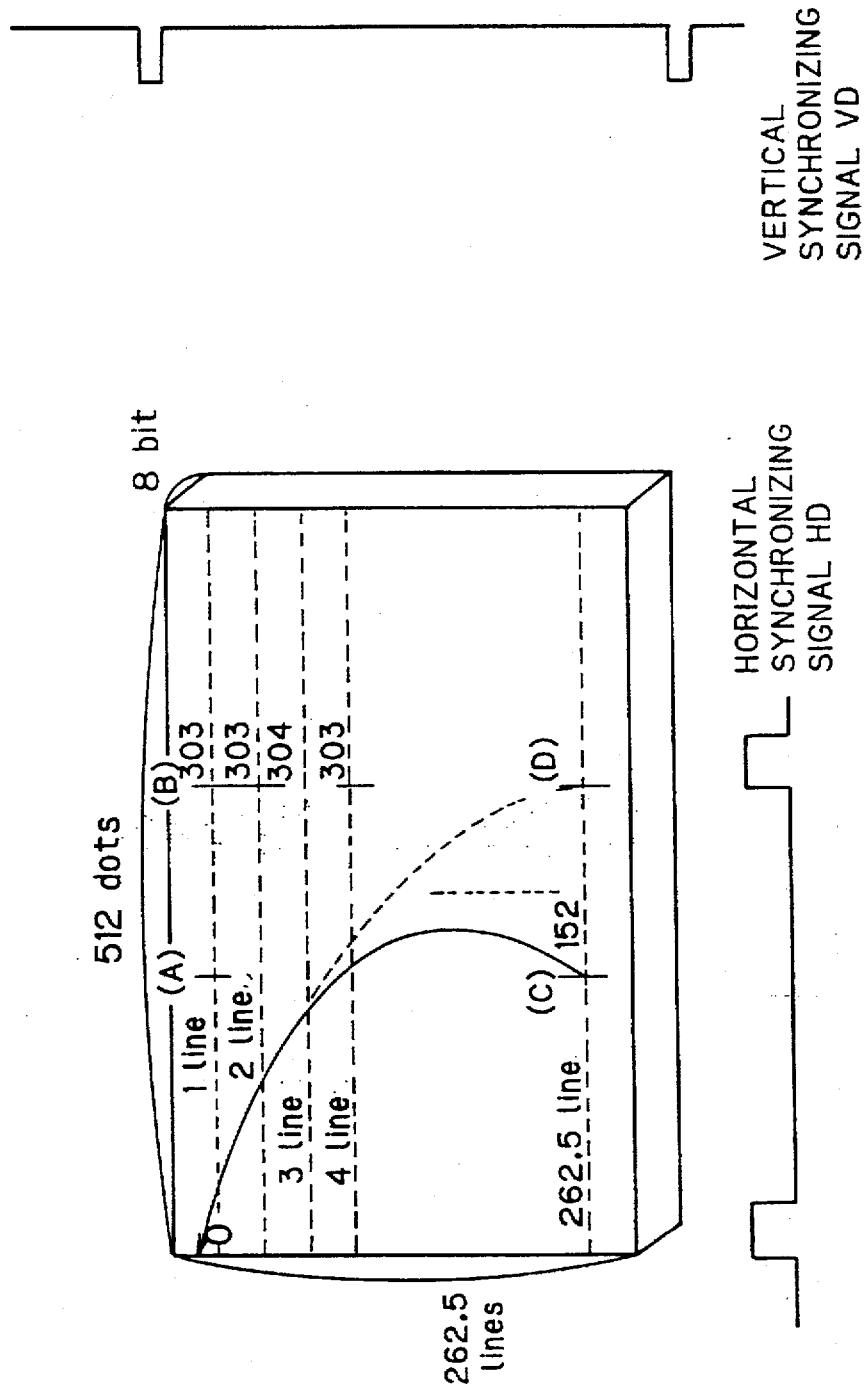
FIGS. 4A and 4B are explanatory diagrams showing the manner in which a horizontal address is reset by means of a constant value or a horizontal synchronizing signal and writing into and reading from a memory are subsequently performed in the first preferred embodiment of the present invention.
Figure 4B:
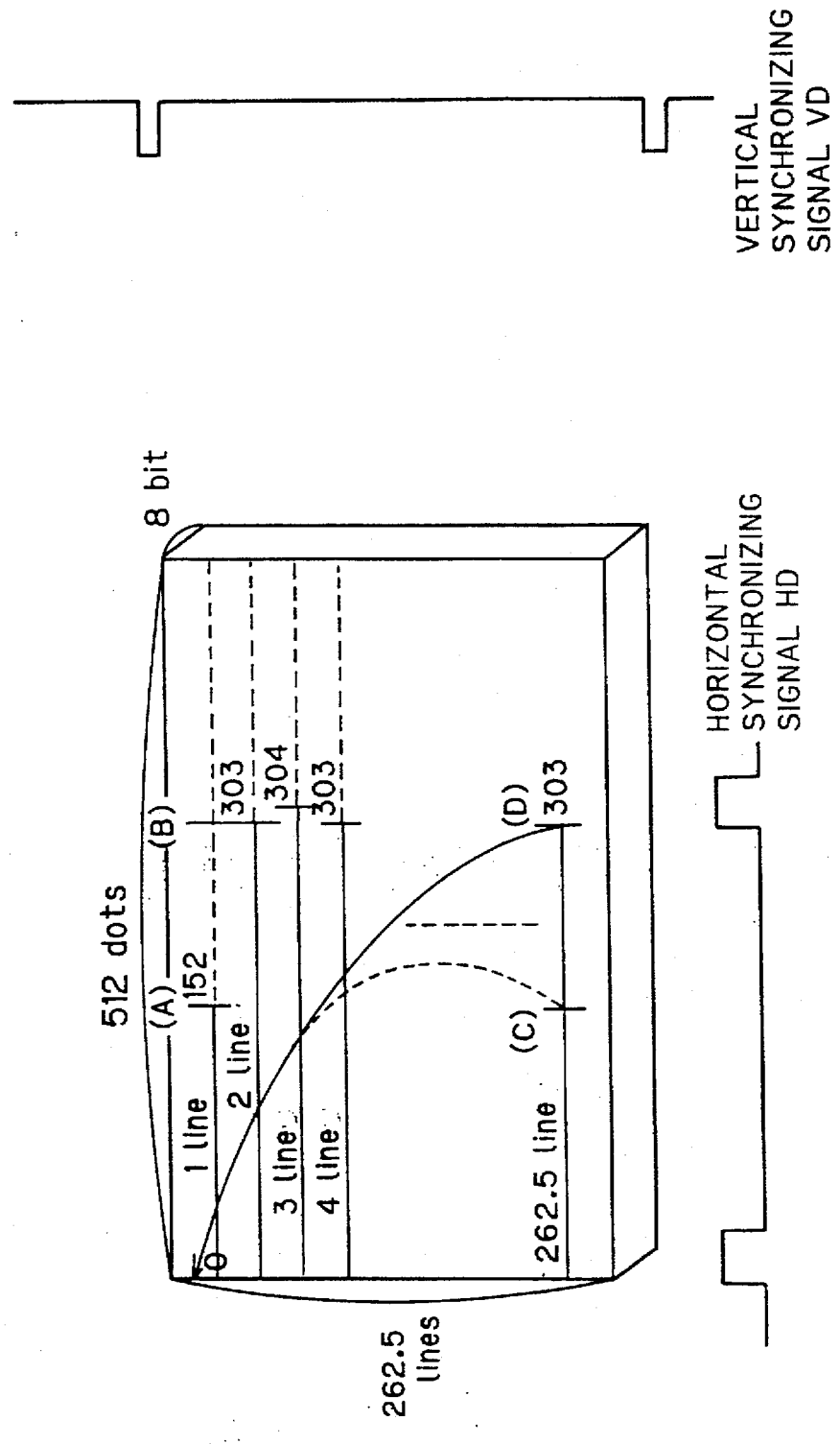

FIGS. 4A and 4B are explanatory diagrams showing writing into a memory and reading from a memory.

Now, an operation in the first preferred embodiment will be described.

In the structure of FIG. 1, the field sequential signal generator 1 converts the three primary color signals R, G and B into the field sequential signal M. Although the primary color signals are R, G and B signals in the present embodiment, cyan, yellow and magenta signals may be used as the primary color signals.

The field sequential signal M is outputted at a speed three times faster than when the primary color signals are written as in the conventional techniques.

The field sequential signal M is supplied to the monochrome image display apparatus 4 and the coloring apparatus 5 colors the field sequential signal, thereby obtaining a color picture as in the conventional techniques. The control circuit 3 controls the field sequential signal generator 1, the monochrome image display apparatus 4 and the coloring apparatus 5 in accordance with the reference clock CK, the horizontal synchronizing signal HD and the vertical synchronizing signal VD.

The signals may be read at a speed n times faster in the first preferred embodiment rather than at a triple speed as in the conventional techniques. However, when signals expressing the three primary colors are used, to set the speed as n=3 is appropriate considering a cost and the like. The speed set as n<3 is not practical since a picture flickers when n<3.

As described later, the control circuit 3 controls the memory device of the field sequential signal generator 1 so that a the horizontal synchronizing signal n times faster is continuously outputted at equal intervals in synchronization with primary color signals outputted from the memory device which are n times faster than the original primary color signals.

The monochrome image display apparatus 4 includes a CRT and the like and displays the field sequential signal M as in the conventional techniques. The coloring apparatus 5 includes color filters of red, green and blue, for example, and a motor as in the conventional techniques. The reference clock generating circuit 2 is formed by the phase comparator 29, the VCO 30 and the frequency conversion circuit 33 so as to generate a reference clock which is synchronized with the horizontal synchronizing signal HD as in the conventional techniques.

Now, an operation within the field sequential signal generator 1 shown in FIG. 2 will be described.

The primary color signals R, G and B are outputted after converted into signals having a speed of n=3 by the memory device 10 which is formed by the A/D conversion device 6 including A/D convertors, the memory unit 7 including the memories and the D/A conversion device 8 including D/A convertors.

The memories are under the control of the write control signals W and W' and the read control signals R and R'.

The primary color signals converted into triple speed signals are switched by the switching device 9 for every field of the read signal, and outputted as the field sequential RGB signal M.

Since the horizontal synchronizing signal appears continuously at equal intervals in the field sequential signal M, even if the field sequential signal M is supplied to a CRT or the like which is disposed in the monochrome image display apparatus, horizontal scanning is performed continuously without malfunction of the AFC. Further, it is possible to stably output a high voltage which is generated by a fly back transducer. Thus, a picture is displayed without any disturbance on the screen or a change in the brightness.

Now, an internal operation of the control circuit 3 will be described while referring to FIG. 3.

The field judging circuit 13 judges which field is the field of a currently written image signal and outputs a field judge signal GUK.

It is possible to find whether the field is an even-numbered field or an odd-numbered field by detecting a phase difference between the vertical synchronizing signal and the horizontal synchronizing signal.

The horizontal synchronizing signal has approximately the same phase with the vertical synchronizing signal if the next field is an odd-numbered field but a phase ½ shifted from the phase of the vertical synchronizing signal if the next field is an even-numbered field.

In this manner, once the field in which a signal is currently written is found, whether the output from the field sequential signal generator 1 is in an even-numbered field or an odd-numbered field is known.

During reading, one field (B) which the precedent signal stored as two fields (R, B) are serially outputted.

The same type of fields continue when fields are read in a simple manner as in the conventional techniques. Hence, during triple speed reading, horizontal synchronizing periods are shortened or lengthened twice per field. To prevent this, the read control circuit 15 outputs the plurality of the read control signals R and R' so that the horizontal synchronizing signal of the field sequential signal appears continuously at equal intervals.

The read control signals R and R' are generated on the basis of the horizontal synchronizing signal HD, the vertical synchronizing signal VD and a signal GUKI.

Now, an operation of the memory of the field sequential signal generator 1 will be described with reference to FIGS. 4A and 4B.

As shown in FIGS. 4A and 4B, the memory performs horizontal control for every constant number of addresses in accordance with a control signal which is in synchronization with the horizontal synchronizing signal HD. During vertical control performed by the memory, the memory stores one field of an image signal and resets a memory address in response to a control signal which is in synchronization with the vertical synchronizing signal VD.

Using such a memory which can reset a memory address (address position) of the horizontal direction and resetting a horizontal or vertical address at the positions (A), (B), (C) and (D) in FIGS. 4A and 4B, the horizontal synchronizing signal is controlled so as to appear continuously at equal intervals.

In this method, although a picture is switched halfway or an address having no picture is read in the top or the bottom line, switching of the picture and the address having no picture are not displayed on the CRT or the like in reality. Controlling in such a manner, it is possible to ensure that the horizontal synchronizing signal appears continuously at equal intervals. When the interlace signal is an NTSC signal as in FIGS. 4A and 4B, 262.5 horizontal synchronizing signals are supplied during a vertical synchronizing period. Hence, the horizontal synchronizing signal when reset by the vertical synchronizing signal has only half the width.

The memory of FIG. 4A is a memory in which an even-numbered field is written and the memory of FIG. 4B is a memory in which an odd-numbered field is written. By reading the fields while adjusting read positions from these memories, it is possible to ensure that the horizontal synchronizing signal appears continuously at equal intervals.

The control circuit operates so that a signal corresponding to half the width of the horizontal synchronizing period is not outputted during continuous reading of the same type of fields, in particular.

An advantage of these memories can be seen on the third lines shown in FIGS. 4A and 4B. Even if the number of write clocks or read clocks (ADC, DAC) is increased, only one more clock is additionally read from the third line without influencing the overall operation.

When the conventional memories are used, a change of one clock influences the overall operation. In contrast, use of the memories of FIGS. 4A and 4B deals with a change in the number of the clocks.

However, since the memory field (the field of the signal stored in the memory) is not the same as the display field (the field of the signal displayed on the display apparatus 4), the picture is displaced in the vertical direction and the vertical resolution is deteriorated.

The color image display apparatus of the first preferred embodiment has the structure described above. The horizontal synchronizing signal of the field sequential signal M is outputted continuously in a constant cycle, and therefore, the color image display apparatus using the field sequential signal does not cause any disturbance on the screen or a change in the brightness.

However, if the vertical scanning is maintained simply as ⅓, a displayed picture is displaced because the memory field is different from the display field, thereby causing a new problem of a deteriorated vertical resolution.

<Second Preferred Embodiment>

Now, a second preferred embodiment will be described with reference to drawings.

Figure 5:
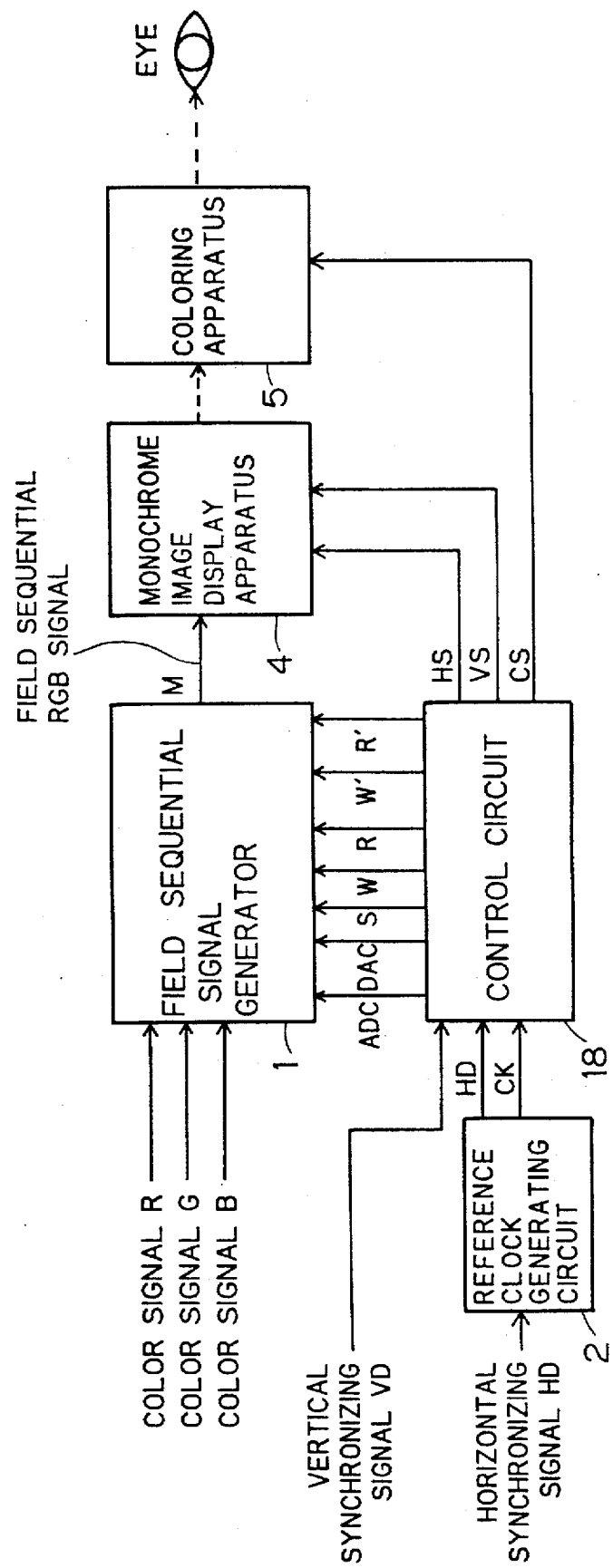
FIG. 5 is a schematic diagram showing a structure of a color image display apparatus which uses a field sequential signal according to a second preferred embodiment of the present invention.

FIG. 5 is a schematic diagram showing a structure of a color image display apparatus which uses a field sequential signal according to the second preferred embodiment of the present invention.

In FIG. 5, the primary color signals R, G and B are image signals which are separated from the same interlace signal.

As shown in FIG. 5, the color image display apparatus of the second preferred embodiment includes the field sequential signal generator 1, the reference clock generating circuit 2, a control circuit 18, the monochrome image display apparatus 4 and the coloring apparatus 5.

Figure 6:
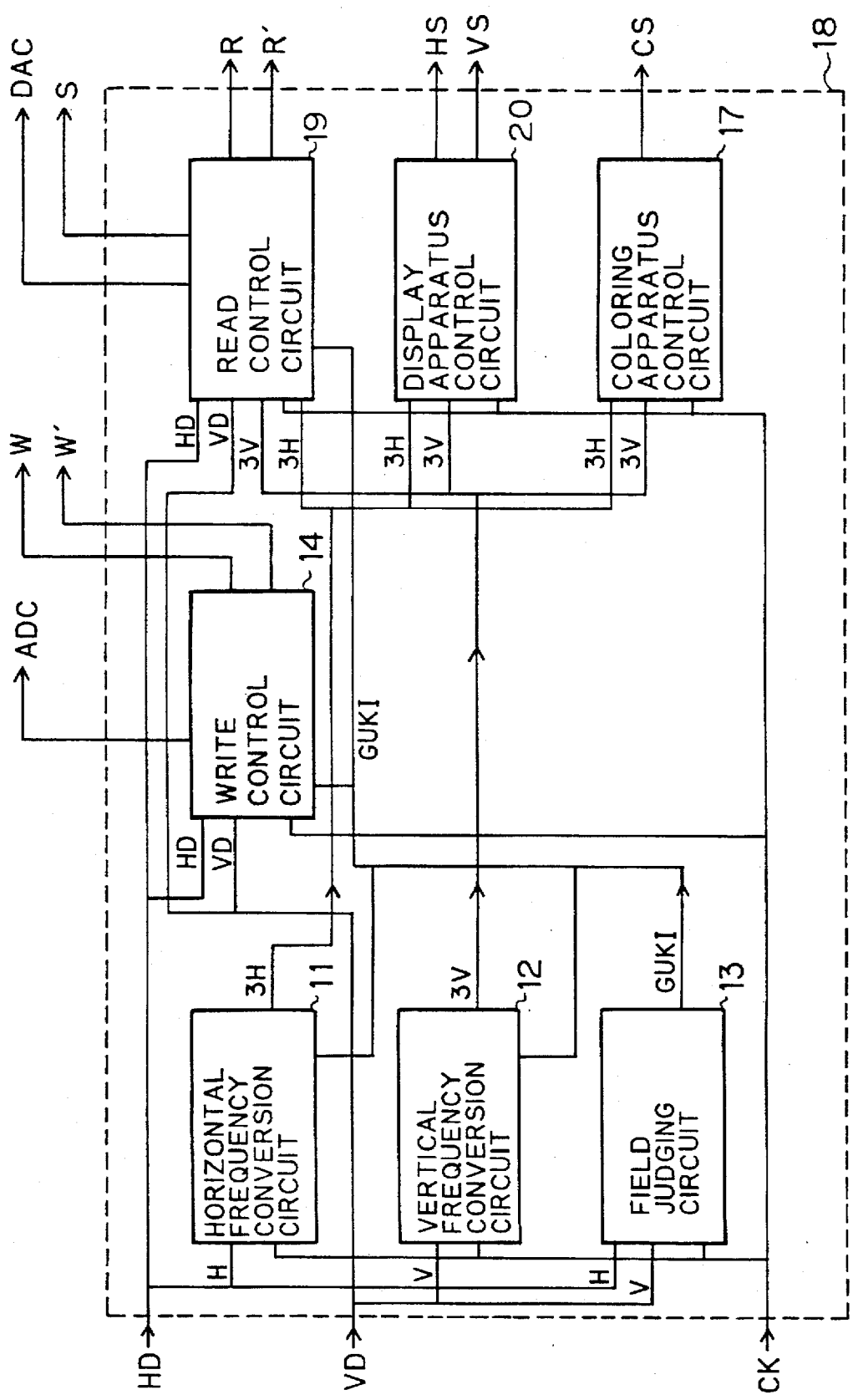
FIG. 6 is a view showing a structure of a control circuit used in the second preferred embodiment of the present invention.

FIG. 6 is a view showing a structure of the control circuit 18, the most characteristic element of the second preferred embodiment.

In FIG. 6, a read control circuit 19 controls the field sequential signal generator 1 so that the field sequential signal generator 1 outputs the field sequential signal M continuously at equal intervals with an n times faster horizontal synchronizing cycle.

The display apparatus control circuit 20 controls vertical deflection scanning by the display apparatus 4 so that vertical scanning is in synchronization with an n-fold or n/2-fold faster speed horizontal synchronizing signal and the display field of the field sequential signal M coincides with a field in which the field sequential signal M was written and so that a change in a vertical scanning width in each field is minimum.

As shown in FIG. 6, the control circuit 18 includes the horizontal frequency conversion circuit 11, the vertical frequency conversion circuit 12, the field judging circuit 13, the write control circuit 14, the read control circuit 19, the display apparatus control circuit 20 and the coloring apparatus control circuit 17.

Although n=3 in the second preferred embodiment, $3 \leq n$ is allowed as in the first preferred embodiment.

Figure 7:
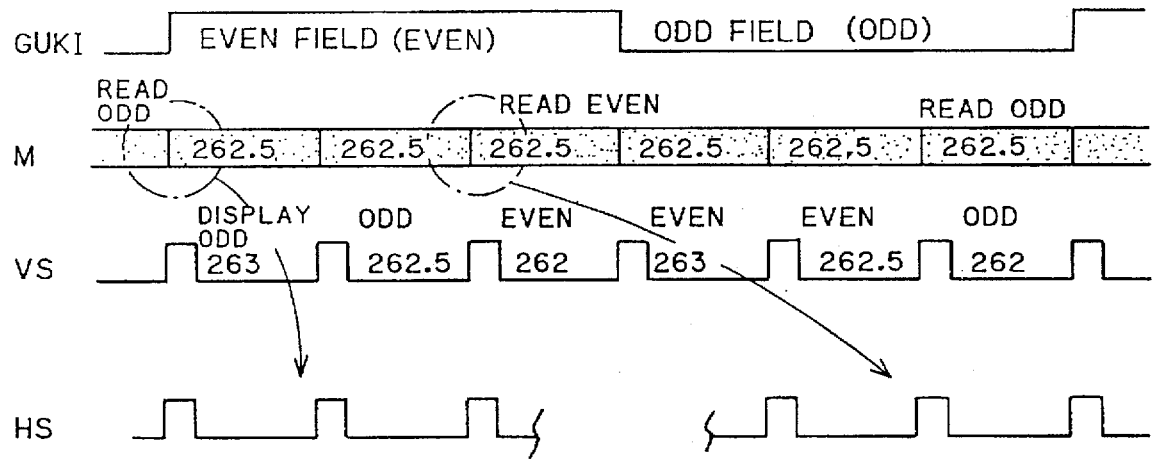
FIG. 7 is an explanatory diagram regarding a field number, a field sequential signal and a vertical scanning width in the second preferred embodiment of the present invention.

FIG. 7 is an explanatory diagram describing a relationship between a field phase of the interlace signal (NTSC signal), a field phase of the field sequential signal read from the memories and vertical scanning.

Figure 8:
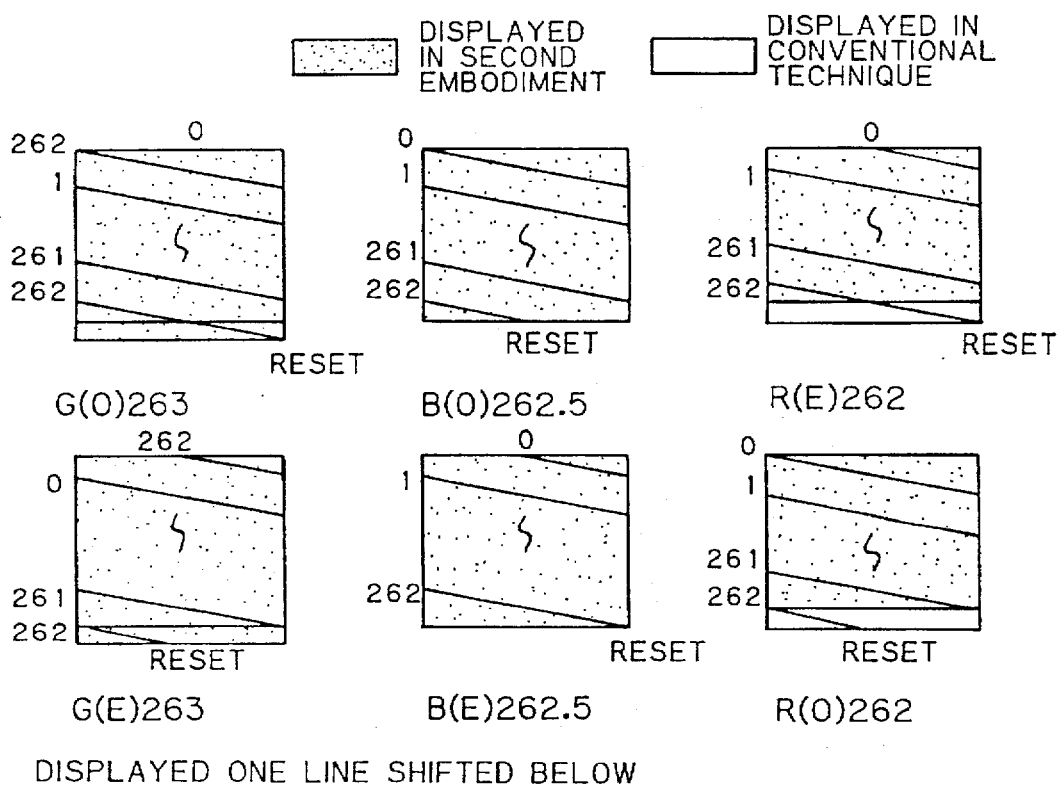
FIG. 8 is an explanatory diagram regarding a position at which an image read from a memory is displayed and vertical scanning in the second preferred embodiment of the present invention.

FIG. 8 is an explanatory diagram showing an example of a screen display displaying an image signal which is scanned by interlacing.

Now, an operation of the second preferred embodiment will be described. As described in relation to the first preferred embodiment, the display apparatus 4 performs stable scanning since the horizontal synchronizing signal of the field sequential signal is outputted continuously. However, in the first preferred embodiment, an image signal may be displayed in a field which is different from a write field because of this. The second preferred embodiment solves this problem of a difference whether the field is an even-numbered field or an odd-numbered field by controlling a vertical scanning position of the display apparatus 4.

The manner in which the read control circuit 19 and the display apparatus control circuit 20 of the control circuit 18 control will be described with reference to FIG. 6. As in the first preferred embodiment, the read control circuit 19 controls the field sequential signal generator so that the horizontal synchronizing signal of the field sequential RGB signal M is outputted continuously.

Since the horizontal synchronizing signal of the field sequential RGB signal M is outputted continuously, the display apparatus control circuit 20 outputs the horizontal control signal HS to the monochrome image display apparatus at a speed about three times faster than the writing speed.

By controlling the operations in this manner, a picture is displayed correctly without malfunction of the AFC like in the first preferred embodiment. The display apparatus control circuit 20 also synchronizes the vertical control signal VS with a signal which has a speed three times faster than that of the horizontal synchronizing signal or with a signal which is ½ period out of phase from a signal which has a speed three times faster than that of the horizontal synchronizing signal. The display apparatus control circuit 20 then changes and outputs the period of the signal as shown in FIG. 7.

Although the vertical control signal is supplied in a constant cycle, since interlacing is not performed normally as described before, displayed lines are displaced from the originally intended positions in the vertical direction on the screen.

To deal with this, the period of the vertical control signal is extended or shortened to create a phase difference from the horizontal control signal.

For example, the vertical control signal is read in synchronization with the horizontal control signal to read an odd-numbered field. By scanning the CRT under the control of the control signal, displayed lines coincide with the originally intended positions and the interlace signal is displayed normally.

The phase difference changes every three fields rather than every field.

Further, when the vertical scanning period is too much different between fields which are read, displayed images can be displaced although the fields coincide with the originally intended positions because scanning cannot return to the vertical scanning starting position within the vertical retrace line period.

To avoid this, the vertical scanning period is set to have as little change as possible. If the vertical scanning period does not change much, scanning can return to the vertical scanning starting position well before the end of the vertical retrace line period. In addition, since the field sequential signal M is read three times faster than the writing speed in the second preferred embodiment, it is easily possible to align fields to the originally intended positions by synchronizing the field sequential signal M with a signal which has a speed three or 3/2 times faster than that of the horizontal synchronizing signal.

For instance, assuming that the period of the triple speed horizontal synchronizing signal is 1 as shown in FIG. 7, one memory field may be scanned in the periods of 263, 262.5 and 262, and the period of any memory field may be repeated.

FIG. 8 shows a display screen in this situation. A display starting position during writing is the same as a display starting position during reading. However, due to the relationship between the memories and resetting, the signal G(E) alone is displayed one line lower.

This problem is solved by disposing a correction circuit which controls the deflecting voltage on the CRT side and increasing the deflecting voltage a little only during the G(E) period. A decrease in the resolution is smaller than in the first preferred embodiment even if such a correction circuit is not disposed.

Thus, in the color image display apparatus of the second preferred embodiment, the horizontal synchronizing signal is continuous even if an interlace image signal is inputted. Further, scanning is performed while aligning write fields but without a large change in vertical scanning in synchronization with a signal which has a speed three or 3/2 times faster than that of the horizontal synchronizing signal. Hence, the color image display apparatus of the second preferred embodiment displays a picture without any disturbance on the screen or a change in the brightness and without largely deteriorating the vertical resolution.

However, since a picture is displayed while aligning fields at the resetting timing of the memories, a part of the scanning lines is displaced in the vertical direction.

<Third Preferred Embodiment>

Now, a third preferred embodiment of the present invention will be described with reference to the drawings.

Figure 9:
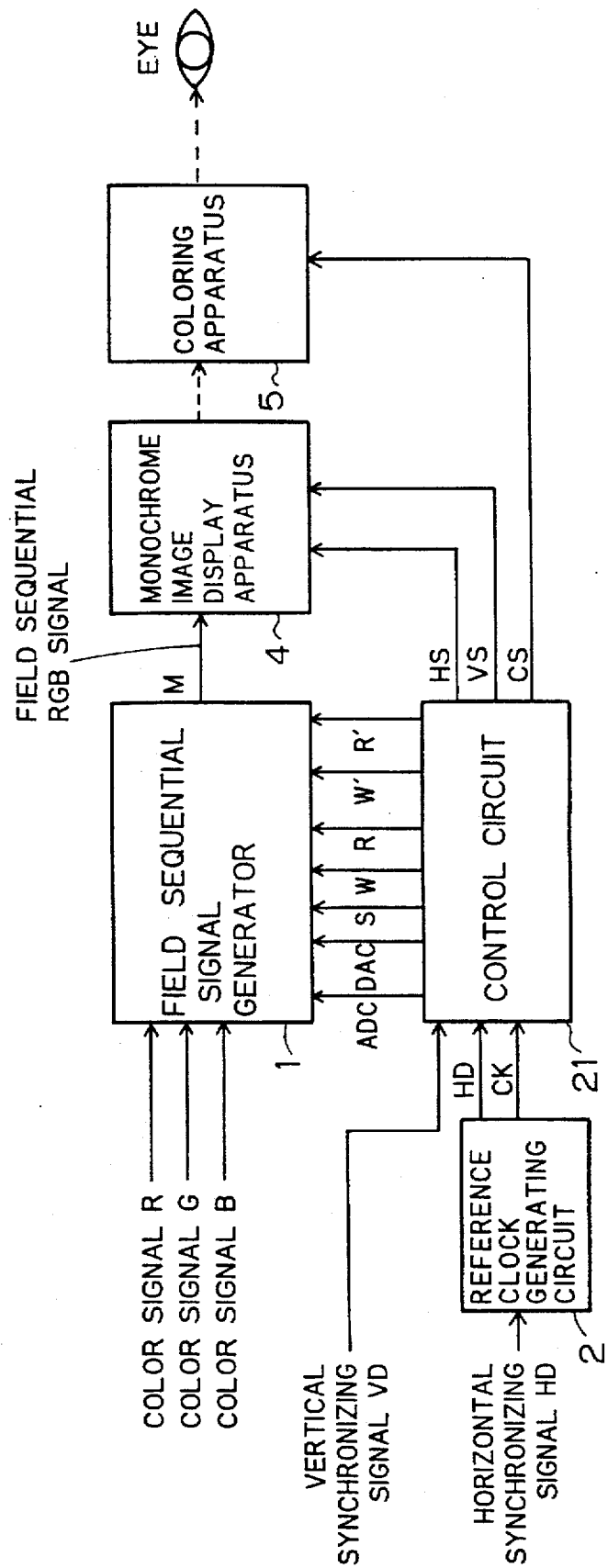
FIG. 9 is a schematic diagram showing a structure of a color image display apparatus which uses a field sequential signal according to a third preferred embodiment of the present invention.

FIG. 9 is a schematic diagram showing a structure of a color image display apparatus which uses a field sequential signal according to the third preferred embodiment of the present invention.

In FIG. 9, the primary color signals R, G and B are interlace signals. As shown in FIG. 9, the color image display apparatus of the third preferred embodiment includes the field sequential signal generator 1, the reference clock generating circuit 2, a control circuit 21, the monochrome image display apparatus 4 and the coloring apparatus 5.

Figure 10:
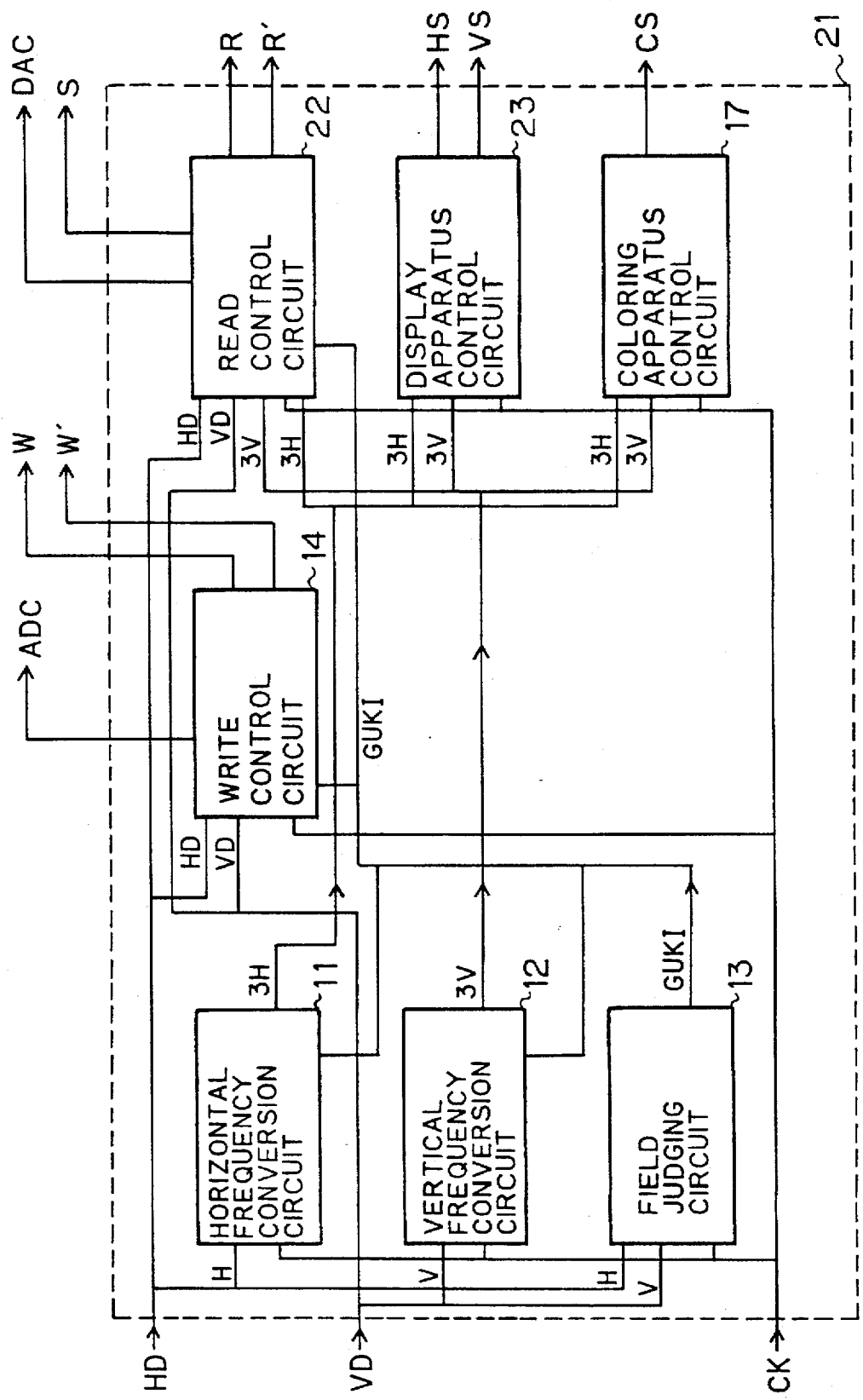
FIG. 10 is a view showing a structure of a control circuit used in the third preferred embodiment of the present invention.

FIG. 10 is a view showing a structure of the control circuit 21 which is the most unique element used in the third preferred embodiment.

In FIG. 10, a read control circuit 22 operates so that the field sequential signal generator 1 outputs the field sequential signal M continuously at equal intervals in an n times faster horizontal period. A display apparatus control circuit 23 controls vertical deflection scanning by the display apparatus 4 so that vertical scanning is in synchronization with an n-fold or n/2-fold faster speed horizontal synchronizing signal and coincides with a field in which the field sequential signal M was written and so that a change in a vertical scanning width in each field is a minimum. As shown in FIG. 10, the control circuit 21 includes the horizontal frequency conversion circuit 11, the vertical frequency conversion circuit 12, the field judging circuit 13, the write control circuit 14, the read control circuit 22, the display apparatus control circuit 23 and the coloring apparatus control circuit 17. Although n=3 in the third preferred embodiment, 3≦n is allowable as in the first preferred embodiment.

Figure 11:
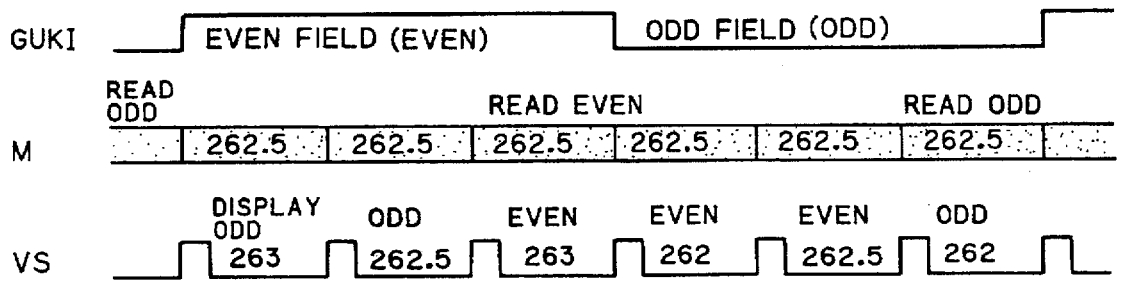
FIG. 11 is an explanatory diagram regarding a field number, a field sequential signal and a vertical scanning width in the third preferred embodiment of the present invention.

FIG. 11 is an explanatory diagram describing a relationship between a field phase of the interlace signal (NTSC signal), a field phase of the field sequential signal read from a memory and vertical scanning.

Figure 12:
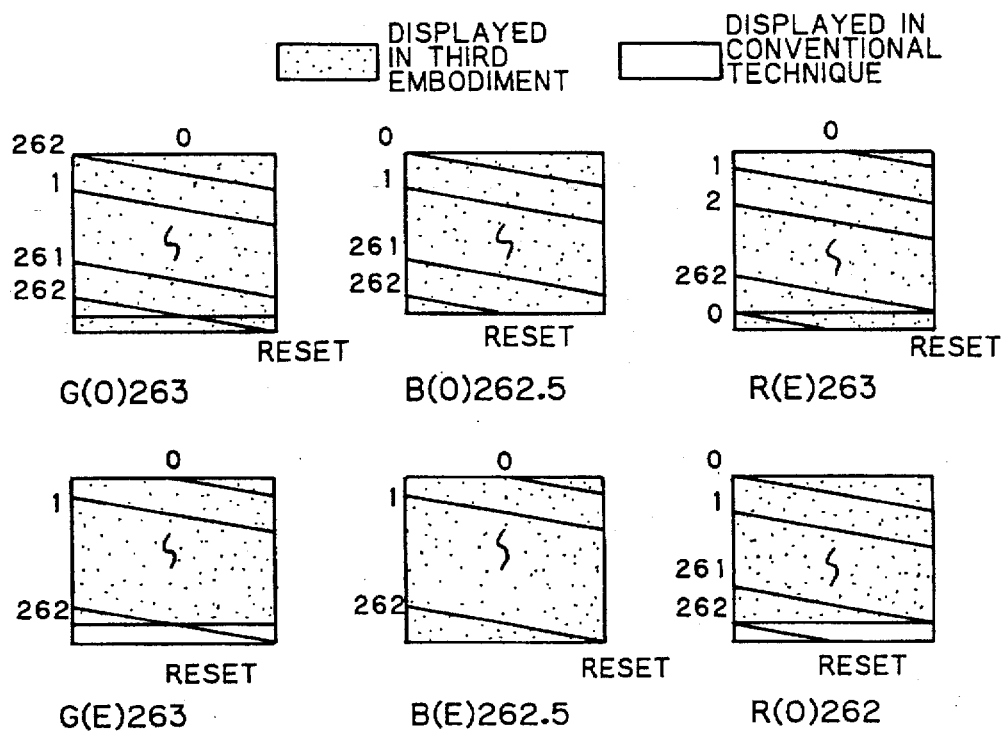
FIG. 12 is an explanatory diagram regarding a position at which an image read from a memory is displayed and vertical scanning in the third preferred embodiment of the present invention.

FIG. 12 is an explanatory diagram showing an example of a screen display displaying an image signal which is interlace scanned.

Now, an operation of the third preferred embodiment will be described.

As described in relation to the second preferred embodiment, by outputting the horizontal synchronizing signal of the field sequential signal continuously and by scanning while coinciding write fields but without a large change in vertical scanning and in synchronization with a signal which has a speed three or 3/2 times faster than that of the horizontal synchronizing signal, it is possible to obtain a color image display apparatus which displays a picture without any disturbance on the screen or a change in the brightness. However, since the resetting timing of the memories and the fields do not coincide with each other, some scanning lines are displaced in the vertical direction.

This occurs in one field out of six fields when fields are read.

The apparatus of the third preferred embodiment solves this problem by changing a relative position of vertical scanning of this field and resetting of the memories. Now, control operations of the read control circuit 22 and the display apparatus control circuit 23 of the control circuit 21 will be described with reference to FIG. 10.

The read control circuit 22 controls the field sequential signal generator 1 so that the field sequential signal generator 1 outputs the horizontal synchronizing signal of the field sequential RGB signal M continuously as in the first preferred embodiment.

Since the horizontal synchronizing signal of the field sequential RGB signal M is continuous, the display apparatus control circuit 23 outputs the horizontal control signal HS to the monochrome image display apparatus at a speed about three times faster than the writing speed. By controlling the operations in this manner, a picture is displayed correctly without malfunction of the AFC like in the first preferred embodiment.

The display apparatus control circuit 23 also synchronizes the vertical control signal VS with a signal which has a speed three times faster than that of the horizontal synchronizing signal or with a signal which is ½ period out of phase from a signal which has a speed three times faster than that of the horizontal synchronizing signal, and changes and outputs the period of the signal as shown in FIG. 10. By changing the phase of the horizontal synchronizing signal with which the vertical control signal period is synchronized every three fields of the field sequential RGB signal, a write field coincides with a read field, and hence, pseudo-interlacing is performed.

The vertical scanning period is set to have as little change as possible as in the second preferred embodiment. Rather than repeating varying cycles in one memory field period as in the second preferred embodiment, scanning is controlled so that the total number of scanned lines becomes equal in a period of two memory fields.

By controlling the operations in this manner, it is possible to align not only the fields but also the scanning positions.

For example, assuming that the period of the triple speed horizontal synchronizing signal is 1 as shown in FIG. 11, scanning may be performed during a period of 263, 262.5 263, 262.5 and 262 from a change point of an even-numbered memory field, i.e., in six display fields. FIG. 12 shows a display screen in this situation. The display starting position remains the same through fields and the same number of lines are scanned.

Thus, in the third preferred embodiment, since scanning is controlled so that both the scanning position and the field number stay unchanged even when an image signal for interlacing is inputted, the color image display apparatus is inexpensive since no additional memory is necessary and the vertical resolution is improved.

However, when a signal not for interlacing is inputted, conventional problems are created such as a change in the scanning position and malfunction of the reference clock generating circuit.

<Fourth Preferred Embodiment>

Now, a fourth preferred embodiment of the present invention will be described with reference to the drawings.

Figure 13:
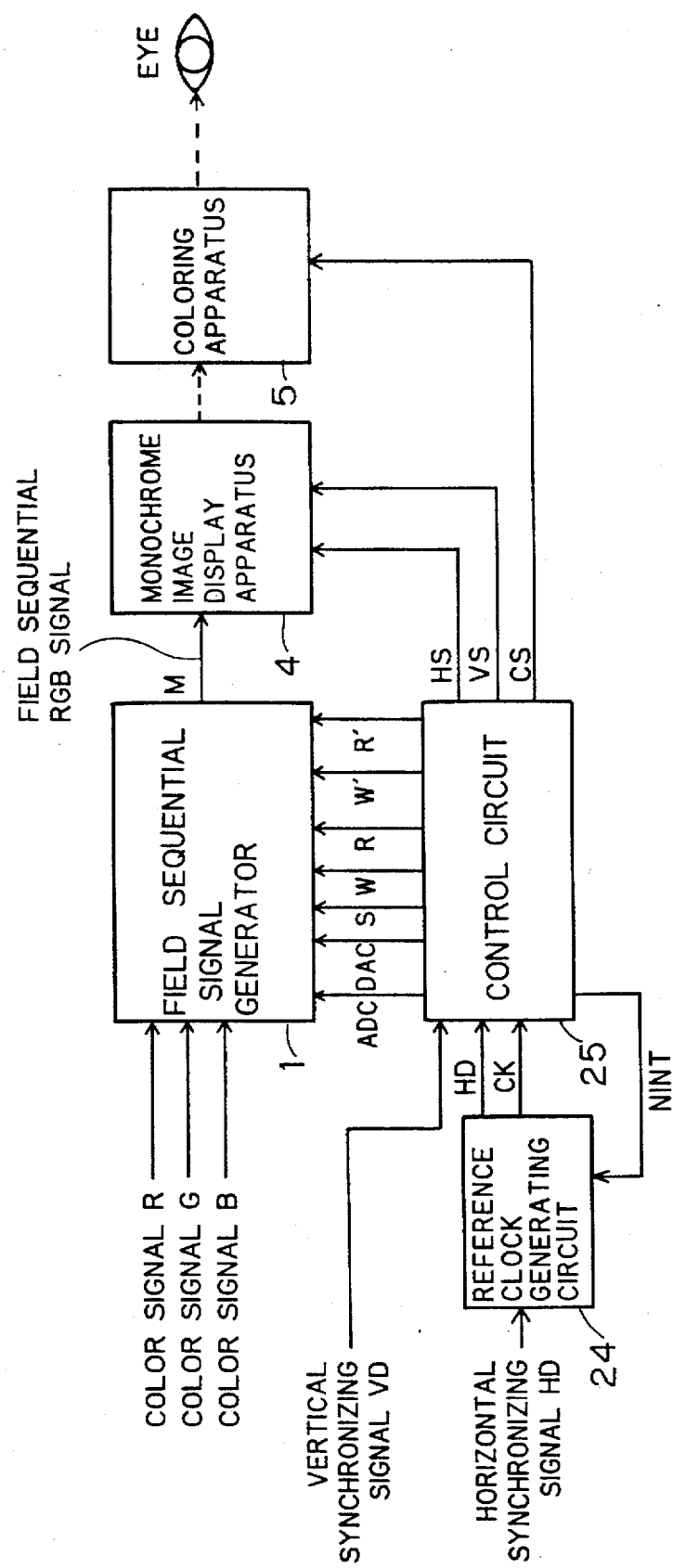
FIG. 13 is a schematic diagram showing a structure of a color image display apparatus which uses a field sequential signal according to a fourth preferred embodiment of the present invention.

FIG. 13 is a schematic diagram showing a structure of a color image display apparatus which uses a field sequential signal according to the fourth preferred embodiment of the present invention.

In FIG. 13, the primary color signals R, G and B are signals obtained from one signal. As shown in FIG. 13, the color image display apparatus of the fourth preferred embodiment includes the field sequential signal generator 1, a reference clock generating circuit 24, a control circuit 25, the monochrome image display apparatus 4 and the coloring apparatus 5.

Figure 14:
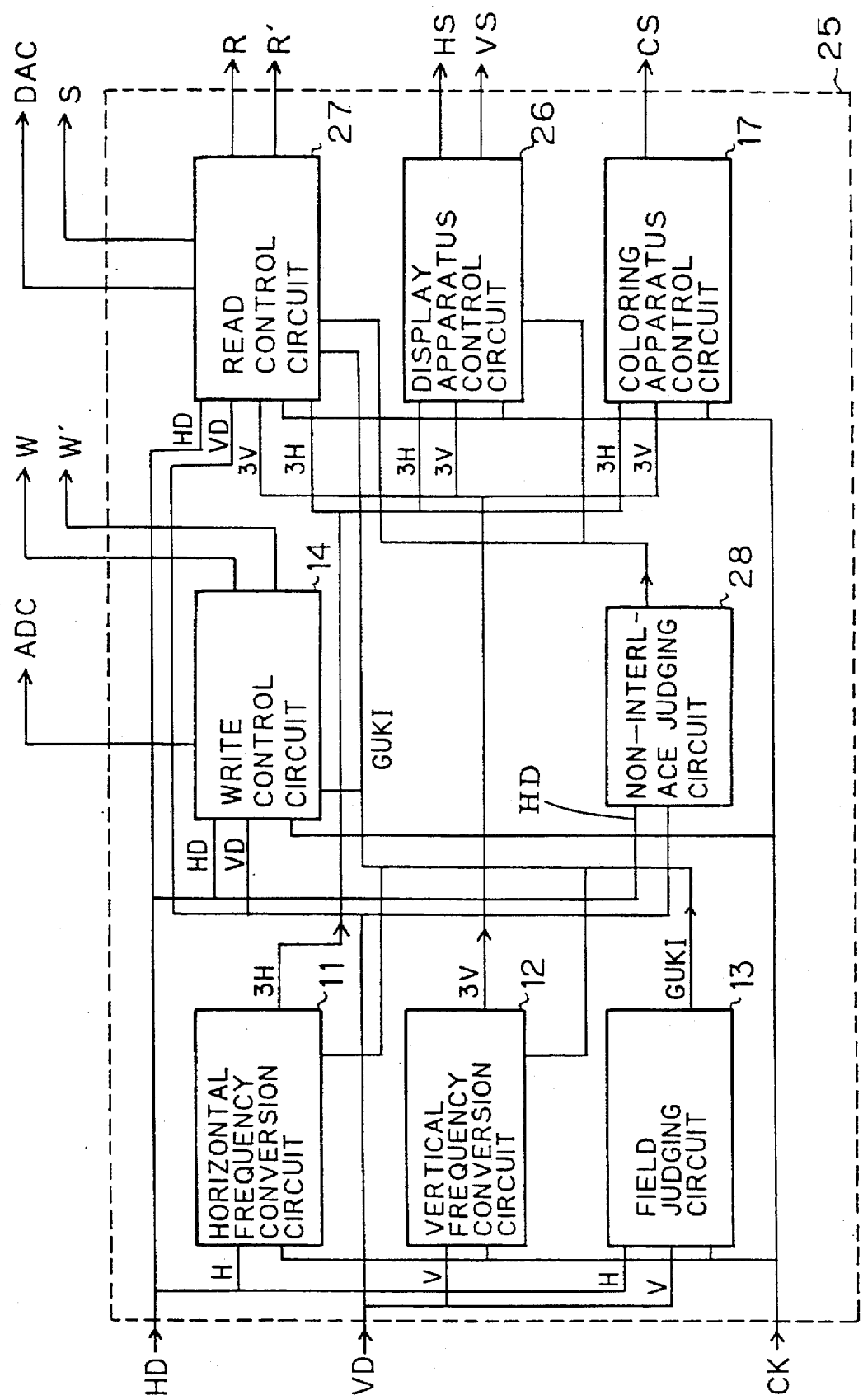
FIG. 14 is a view showing a structure of a control circuit used in the fourth preferred embodiment of the present invention.

FIG. 14 is a view showing a structure of the control circuit 25 which is used in the fourth preferred embodiment.

In FIG. 14, the read control circuit 27 operates so that the field sequential signal generator 1 outputs the field sequential signal M continuously in an n times faster horizontal period.

A display apparatus control circuit 26 controls vertical deflection scanning by the display apparatus 4 so that vertical scanning is in synchronization with an n-fold or n/2-fold faster speed horizontal synchronizing signal and coincides with a field in which the field sequential signal M was written and so that a vertical scanning position is the same through fields and a change in a vertical scanning width in each field is minimum.

To receive an non-interlace signal, the control circuit 25 includes the horizontal frequency conversion circuit 11, the vertical frequency conversion circuit 12, the field judging circuit 13, the write control circuit 14, the read control circuit 27, the display apparatus control circuit 26, the coloring apparatus control circuit 17 and a non-interlace judging circuit 28 as shown in FIG. 14.

Figure 15:
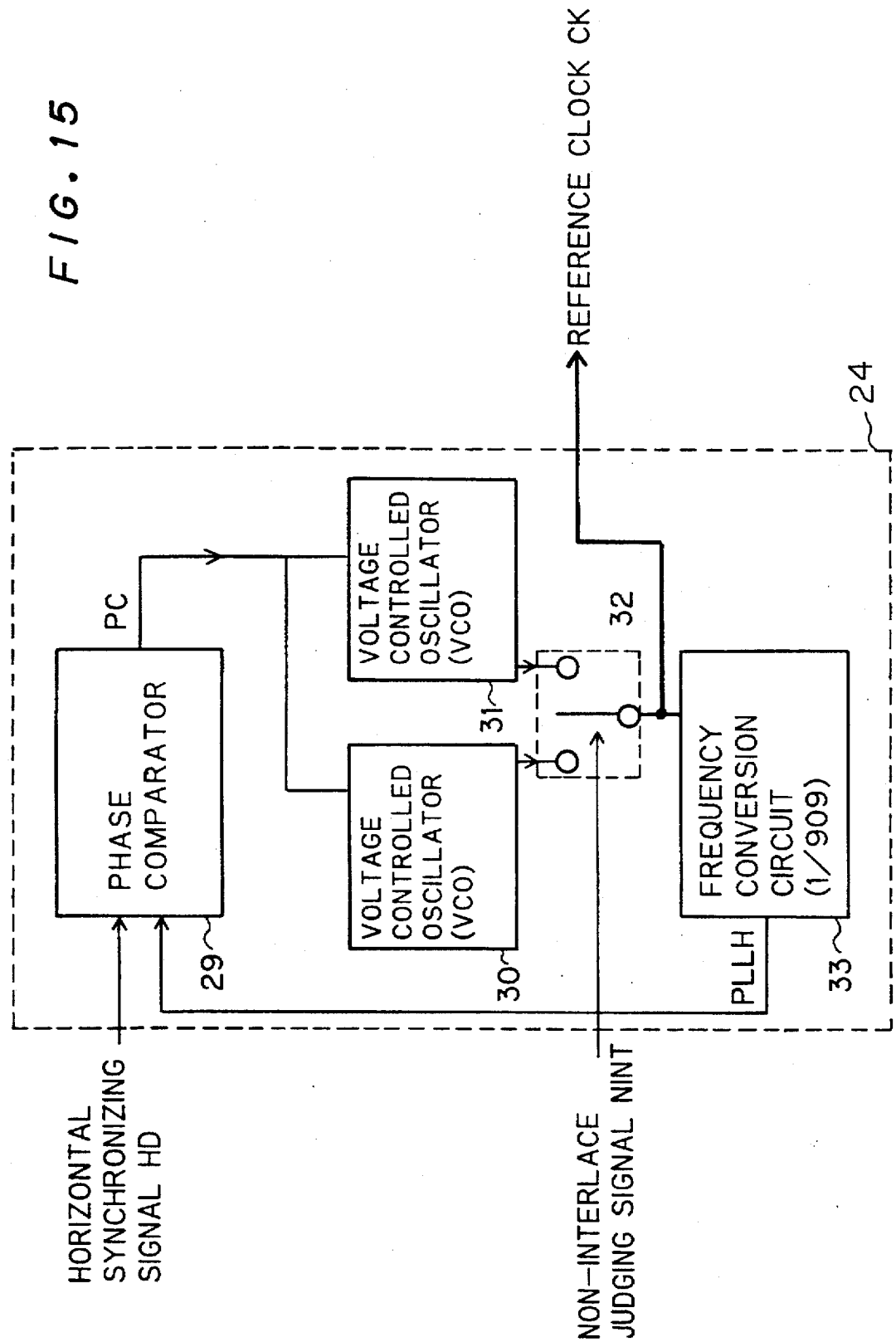
FIG. 15 is a view showing a structure of a reference signal generating circuit used in the fourth preferred embodiment of the present invention.

FIG. 15 is a view showing a structure of the reference clock generating circuit 24 of the fourth preferred embodiment.

In FIG. 15, the reference clock generating circuit 24 is formed by the phase comparator 29, the voltage controlled oscillator (VCO) 30, a non-interlace VCO 31, a switching device 32 and a frequency conversion circuit 33.

Now, an operation of the fourth preferred embodiment will be described.

In the color image display apparatuses of the first to the third preferred embodiments which are structured to receive an interlace signal, when a non-interlace signal is inputted, a displayed picture is disturbed due to a change in the frequency of the vertical synchronizing signal or because the reference clock becomes irregular due to a change in the frequency of the horizontal synchronizing signal.

By disposing the non-interlace judging circuit 28 which detects a non-interlace image signal within the control circuit 25 as shown in FIG. 14, it is possible to control the read control circuit 27 and the display apparatus control circuit 26 at the same time so that interlacing will not be performed.

Further, by sending an output NINT detecting that the signal is a non-interlace signal to the reference clock generating circuit 24, it is possible to deal with a change in the horizontal synchronizing signal.

The reference clock generating circuit 24 of the color image display apparatus which uses a field sequential signal forms a PLL structure which performs based on the horizontal synchronizing signal as in the conventional techniques. When such a PLL is used in a color image display apparatus which uses a triple speed field sequential signal, jittering of the clock during writing influences reading as three times stronger jittering.

To reduce jittering, a conventional PLL is structured to have a narrow lock range. However, when the lock range is narrow, the clock may be unlocked when a signal whose frequency is different from that of the horizontal synchronizing signal of an interlace signal, e.g., the horizontal synchronizing signal of a non-interlace signal, is supplied.

As a result, the sampling position of a picture becomes different and the horizontal resolution is deteriorated, or the clock changes and the respective operations are not normally controlled.

To solve these problems, the reference clock generating circuit 24 comprises two voltage controlled oscillators (VCO) which have different oscillating frequencies from each other with respect to the same voltage as shown in FIG. 15.

One of the two VCOs is the VCO 30 which is the same as that used in the conventional techniques, and the other one of the two VCOs is the non-interlace VCO 31. When an interlace signal is inputted, the VCO 30 oscillates the reference clock. When a non-interlace signal is inputted, the VCO 31 oscillates the reference clock.

The switching device 32 switches the reference clock in accordance the non-interlace judging signal NINT, whereby the reference clock stays locked.

Thus, in the fourth preferred embodiment, even when a non-interlace signal is inputted, by controlling reading or changing vertical or horizontal scanning or by switching the oscillating frequency of the clock after judging the non-interlace signal, the color image display apparatus displays a stable picture.

<Fifth Preferred Embodiment>

Now, a fifth preferred embodiment of the present invention will be described with reference to the drawings.

Figure 16:
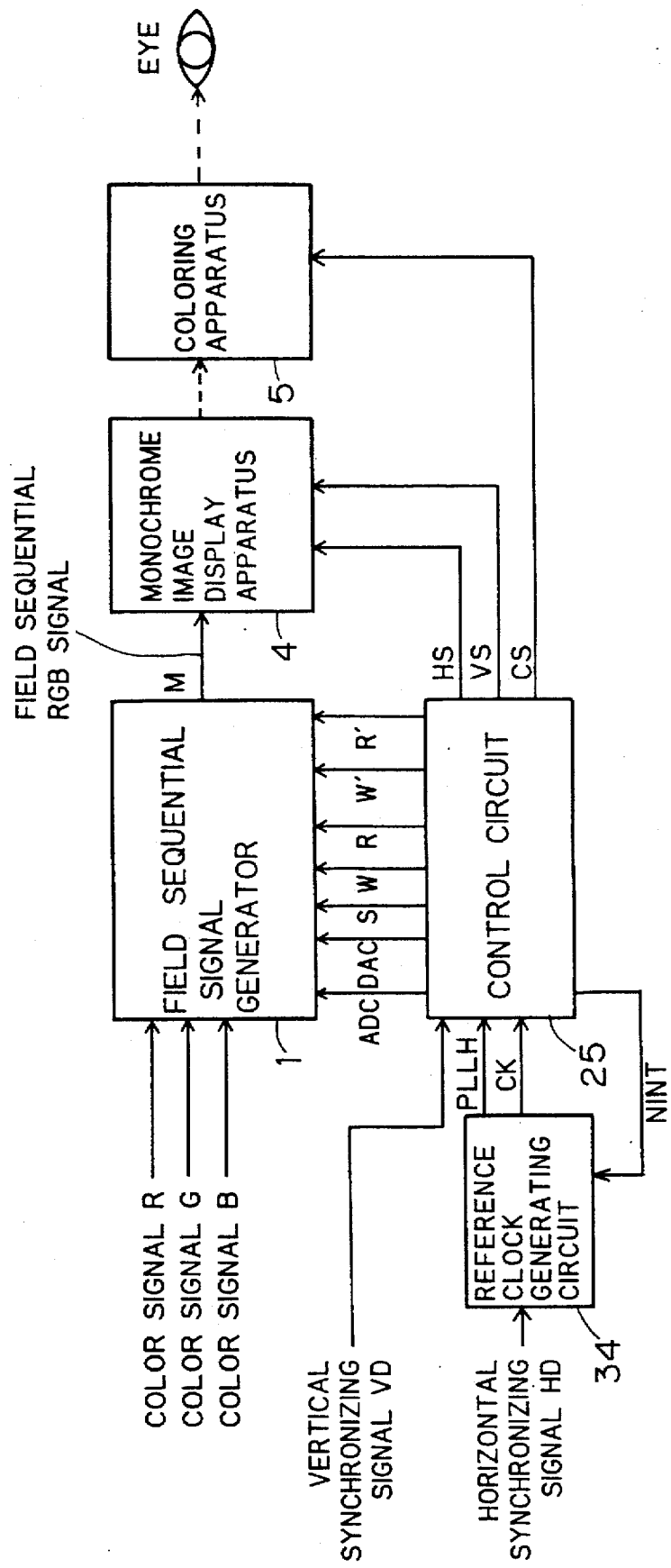
FIG. 16 is a schematic diagram showing a structure of a color image display apparatus which uses a field sequential signal according to a fifth preferred embodiment of the present invention.

FIG. 16 is a schematic diagram showing a structure of a color image display apparatus which uses a field sequential signal according to the fifth preferred embodiment of the present invention.

In FIG. 16, the primary color signals R, G and B are image signals which are separated from one image signal.

As shown in FIG. 16, the color image display apparatus of the fifth preferred embodiment includes the field sequential signal generator 1, a reference clock generating circuit 34, the control circuit 25, the monochrome image display apparatus 4 and the coloring apparatus 5.

Figure 17:
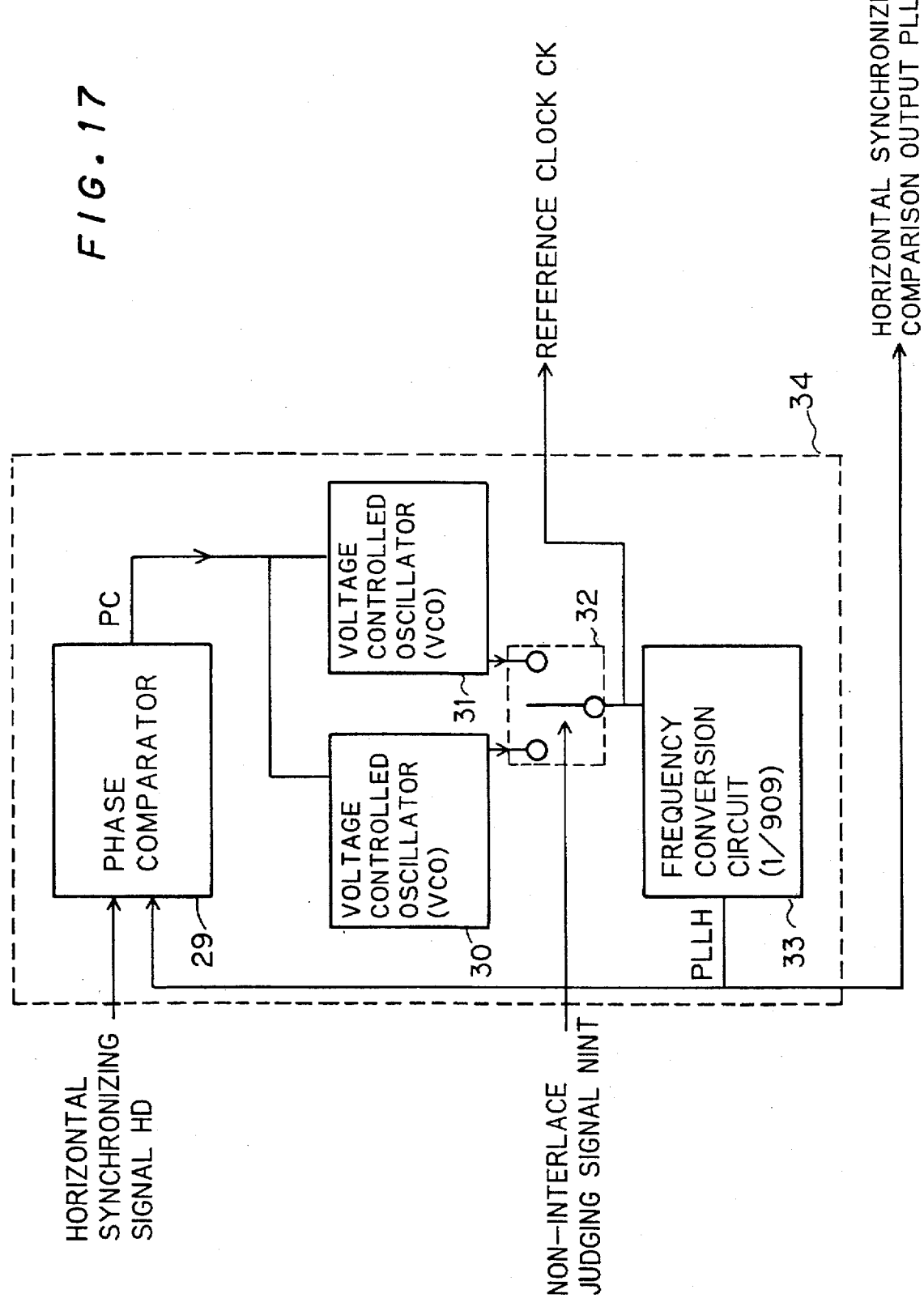
FIG. 17 is a view showing a structure of a reference signal generating circuit used in the fifth preferred embodiment of the present invention.
Figure 18:
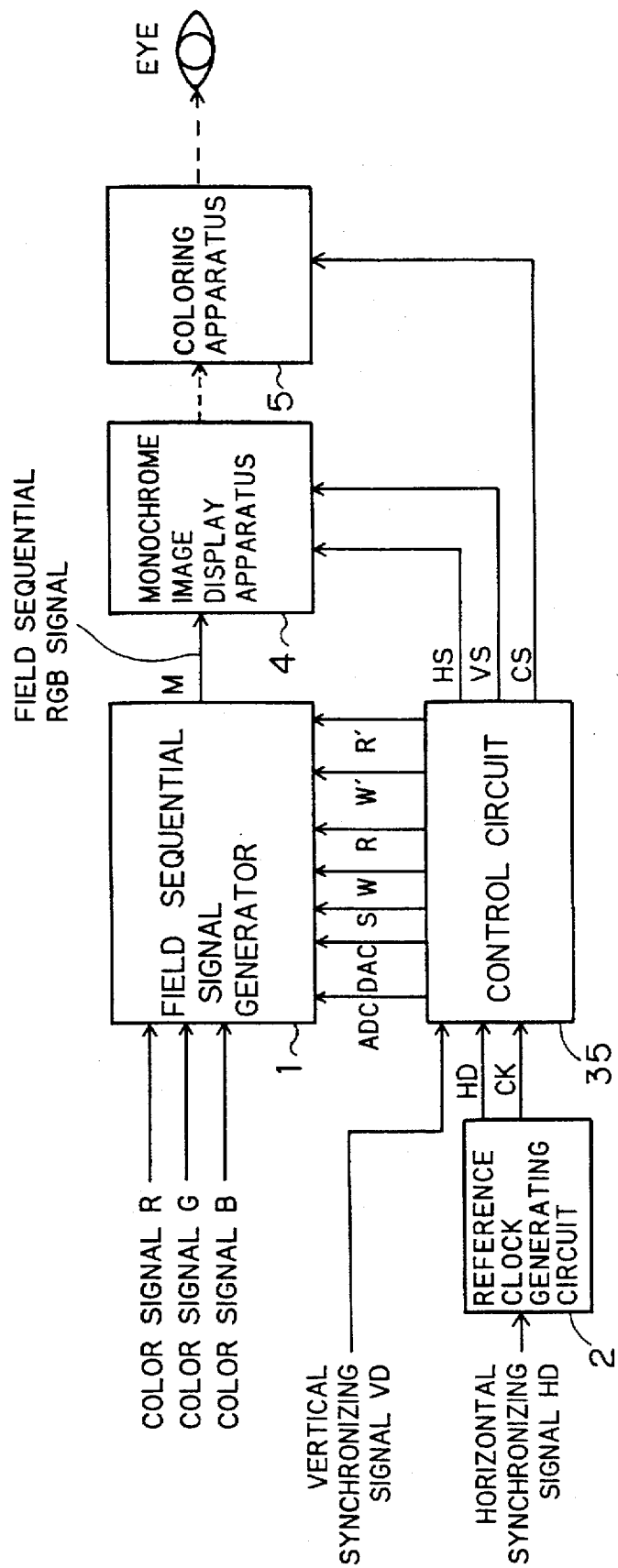
FIG. 18 is a schematic diagram showing a structure of a color image display apparatus which uses a field sequential signal according to a first conventional technique.
Figure 19:
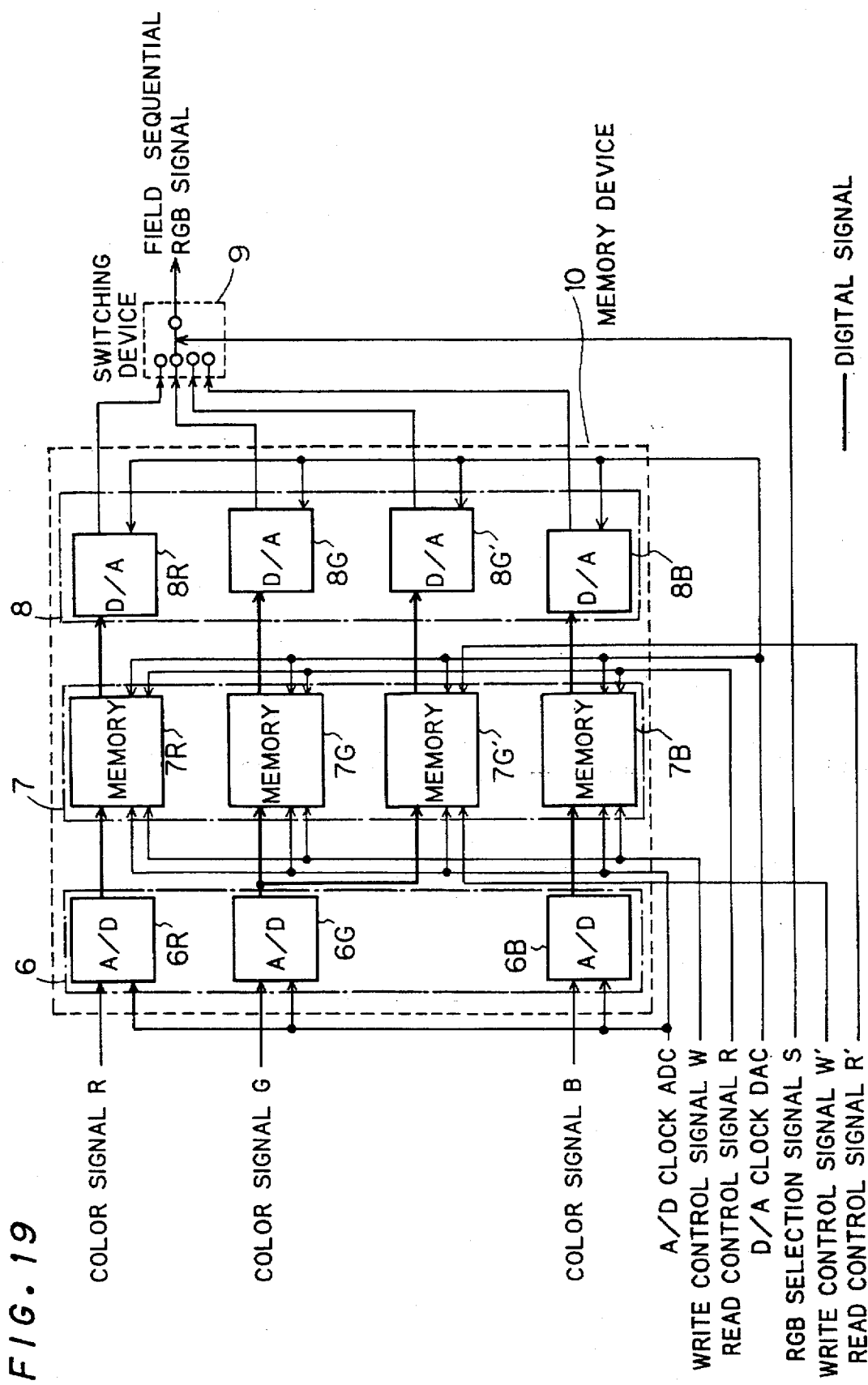
FIG. 19 is a view showing a structure of a field sequential signal generator used in the first conventional technique.
Figure 20:
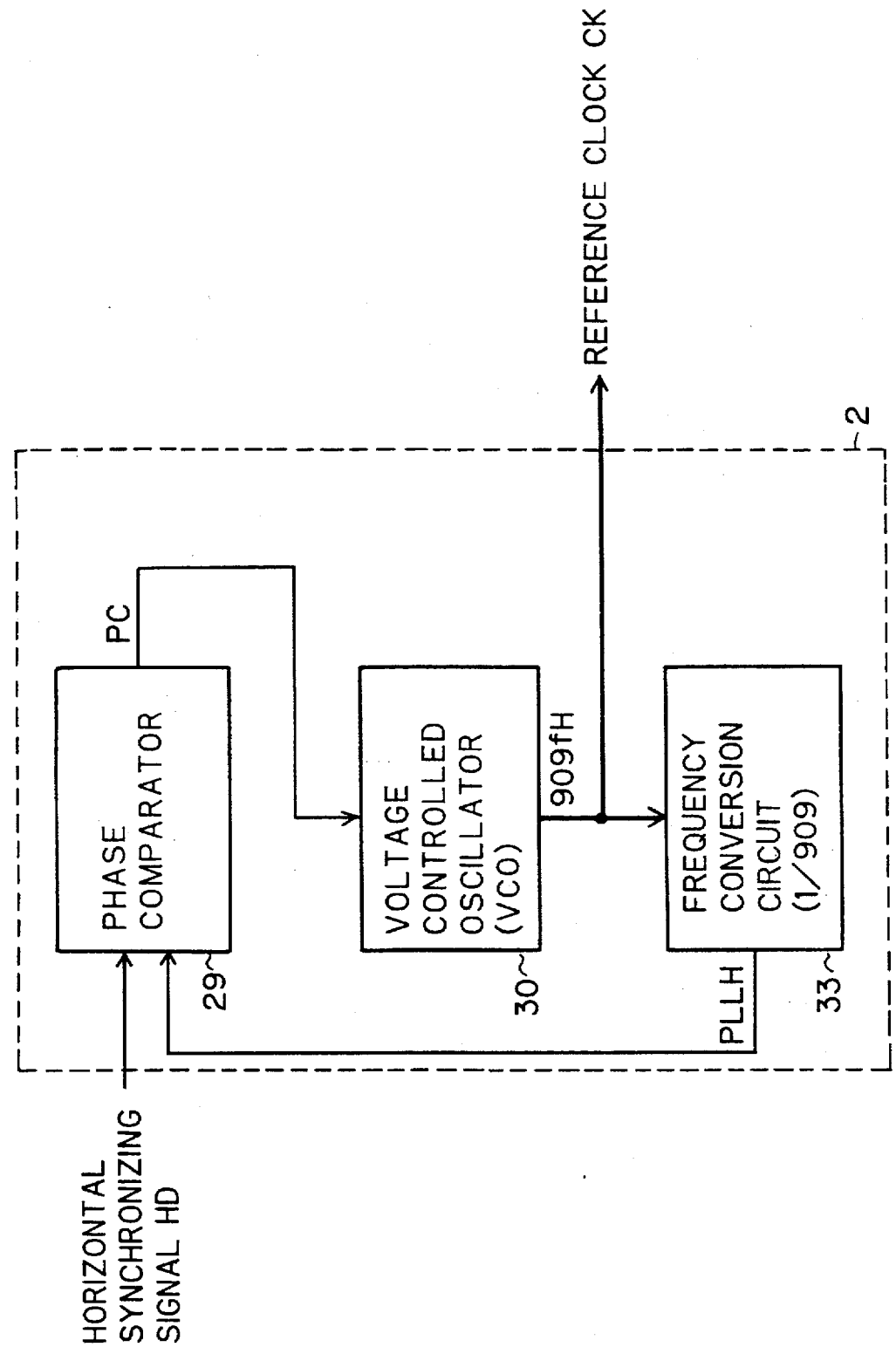
FIG. 20 is a view showing a structure of a reference signal generating circuit used in the first conventional technique.
Figure 21:
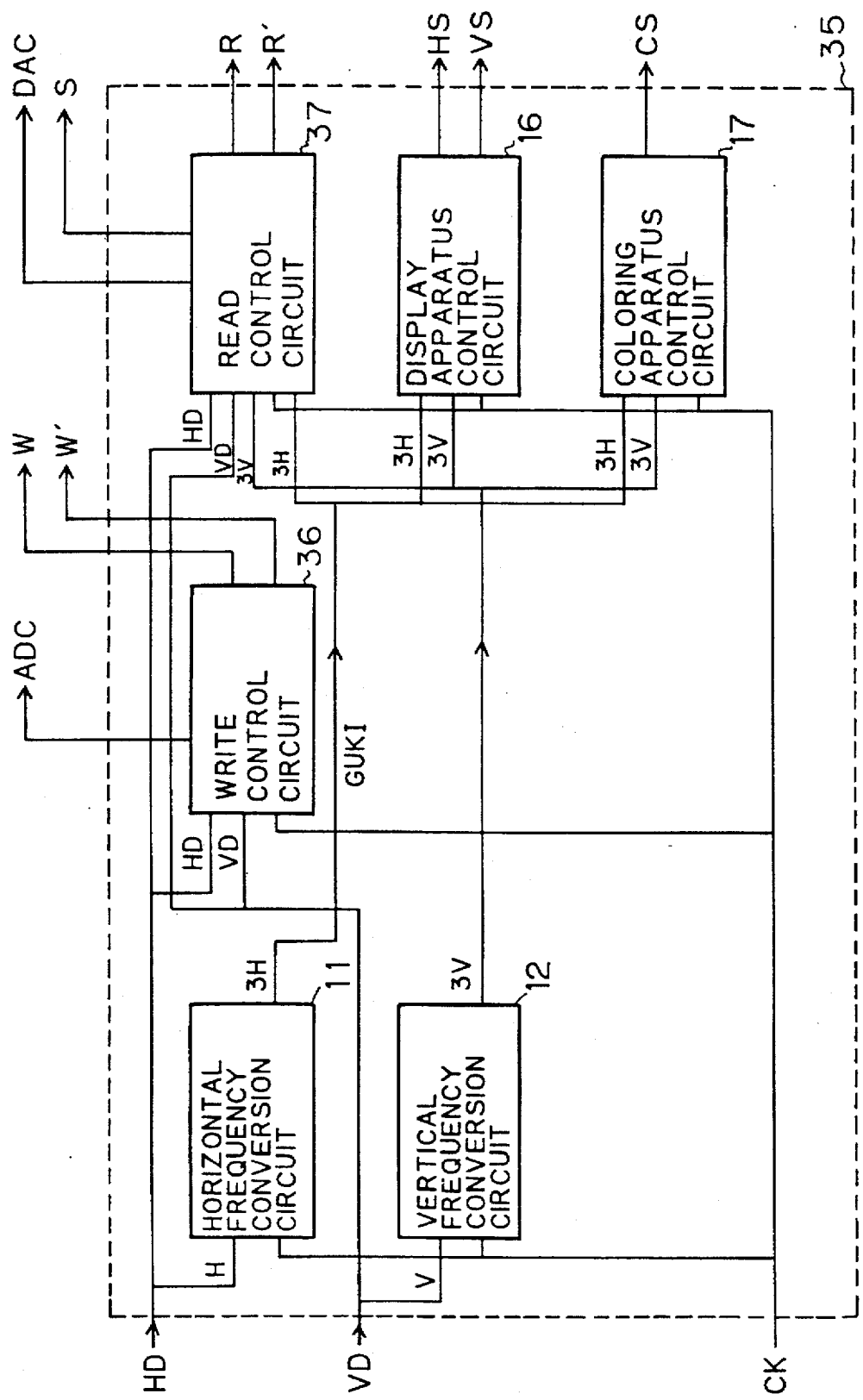
FIG. 21 is a view showing a structure of a control circuit used in the first conventional technique.
Figure 22:
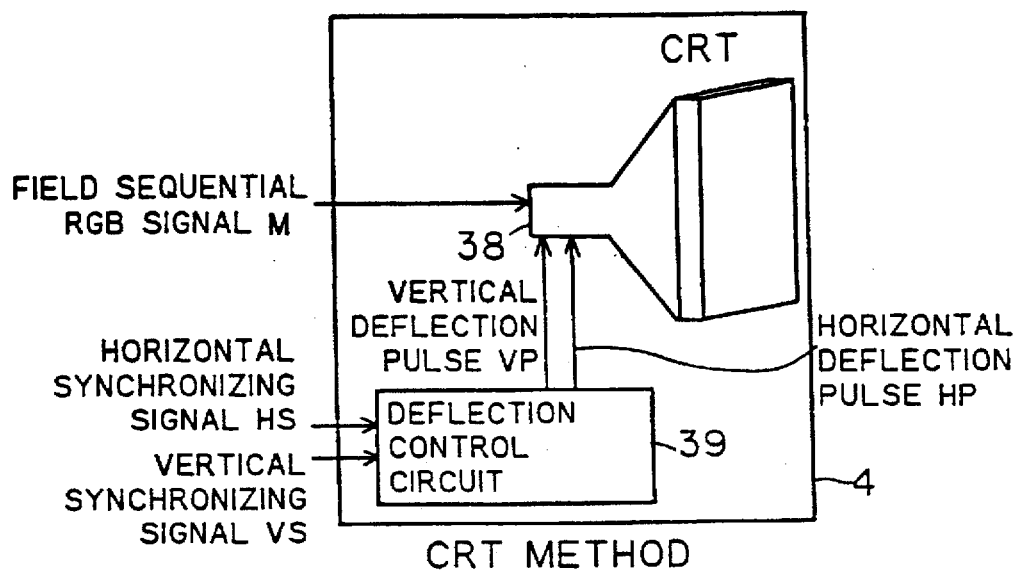
FIG. 22 is a view showing a structure of a monochrome image display apparatus used in the first conventional technique.
Figure 23:
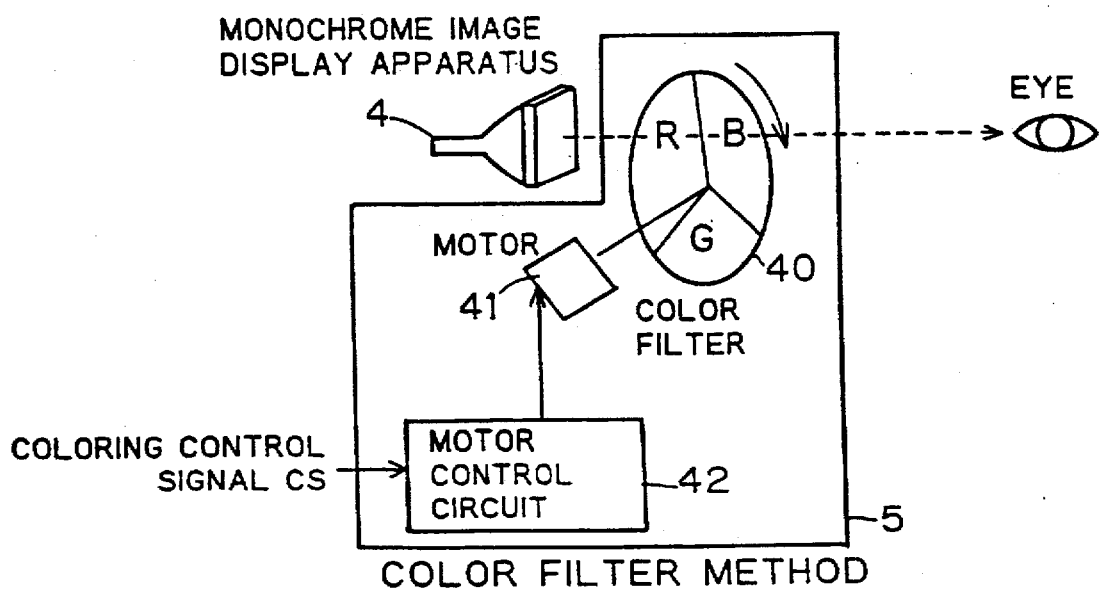
FIG. 23 is a view showing a structure of a coloring apparatus used in the first conventional technique.
Figure 24A:
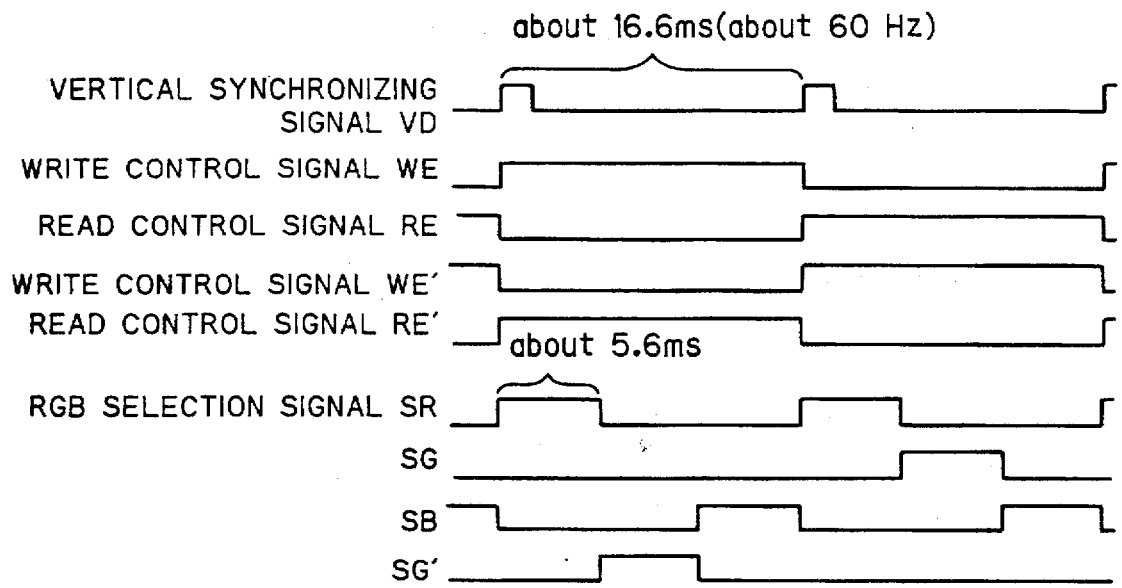
FIGS. 24A to 24C are explanatory diagrams regarding control signals used in the first conventional technique.
Figure 24B:
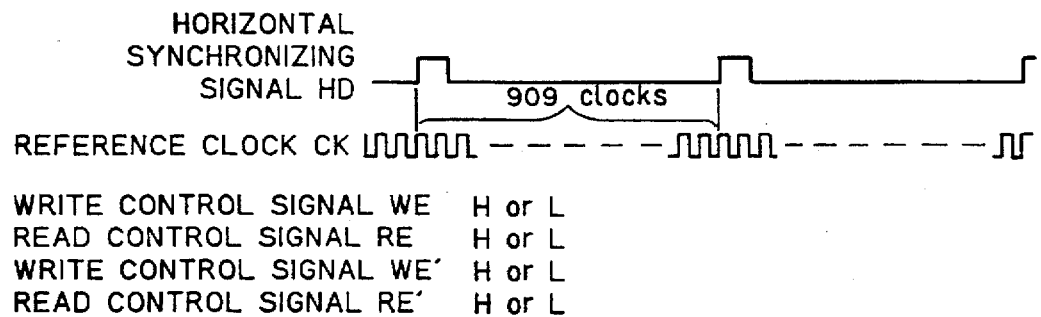
Figure 24C:
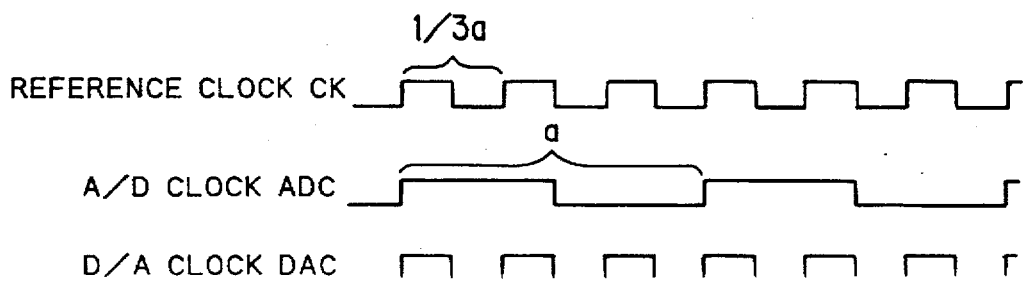
Figure 25A:
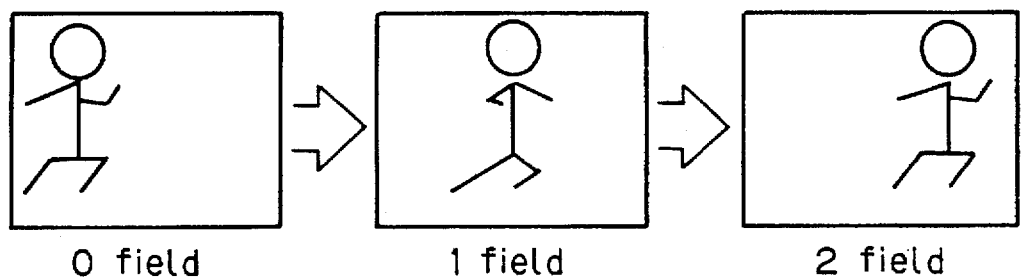
FIGS. 25A and 25B are explanatory diagrams showing a relationship between an image signal and a field in the first conventional technique.
Figure 25B:
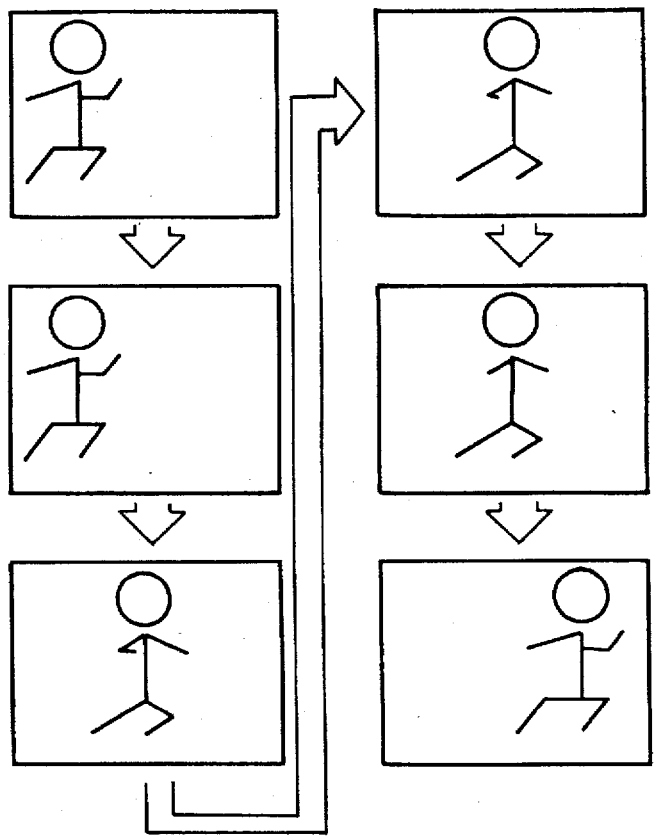
Figure 26:
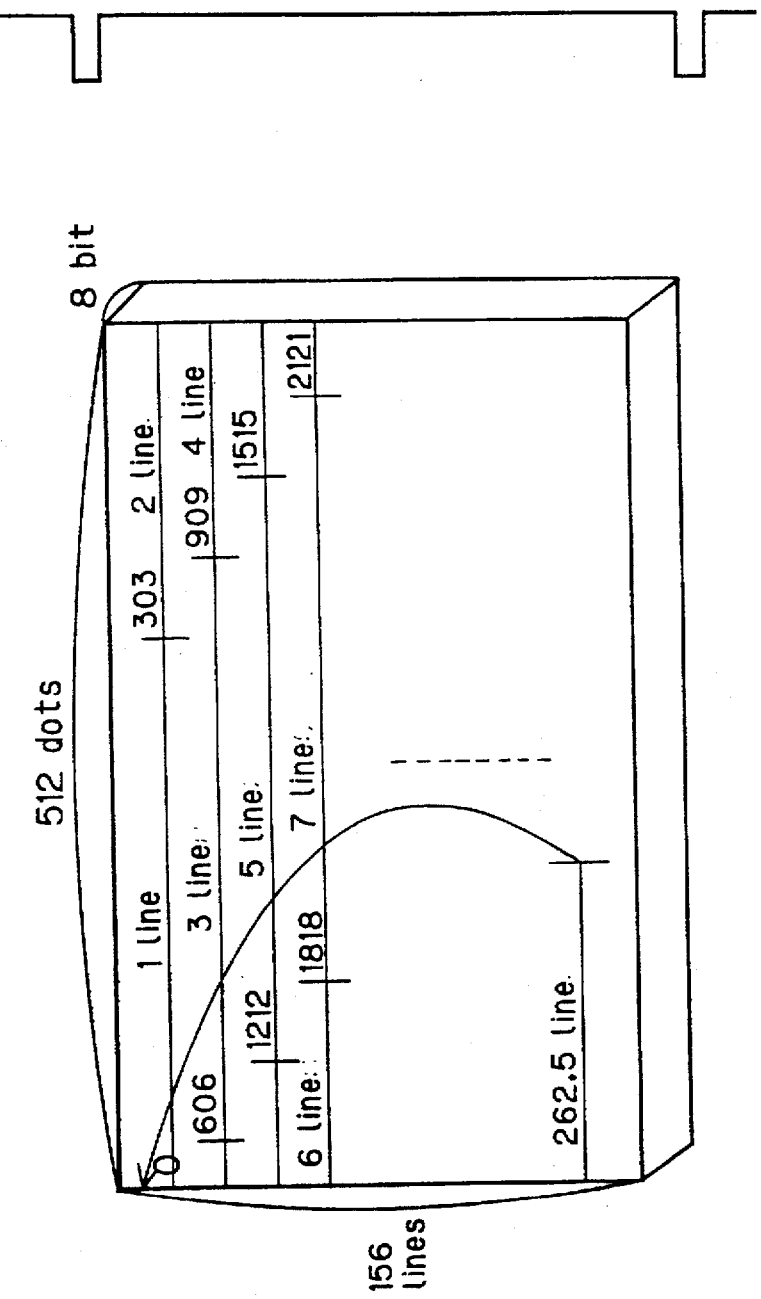
FIG. 26 is an explanatory diagram showing a method of reading from a memory and writing in the memory in the first conventional technique.
Figure 27:
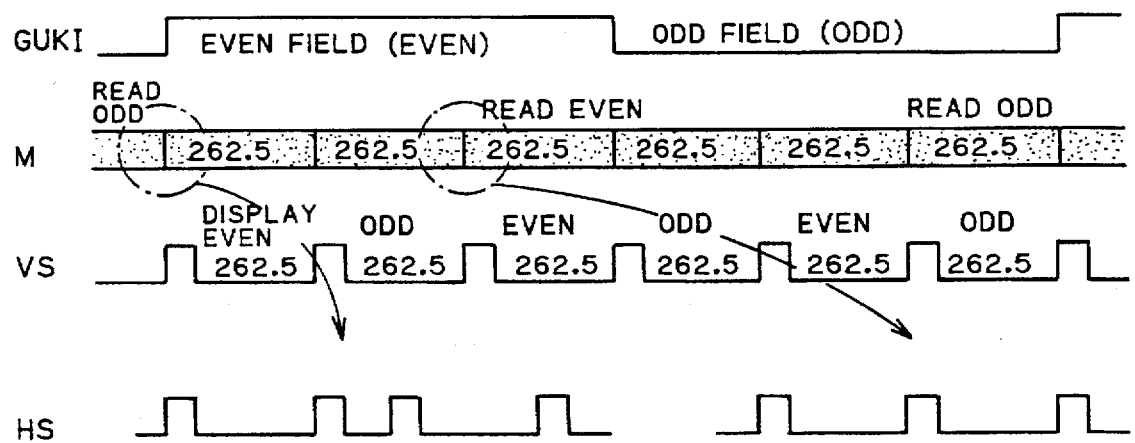
FIG. 27 is an explanatory diagram regarding a field number and a field sequential in the first conventional technique.
Figure 28:
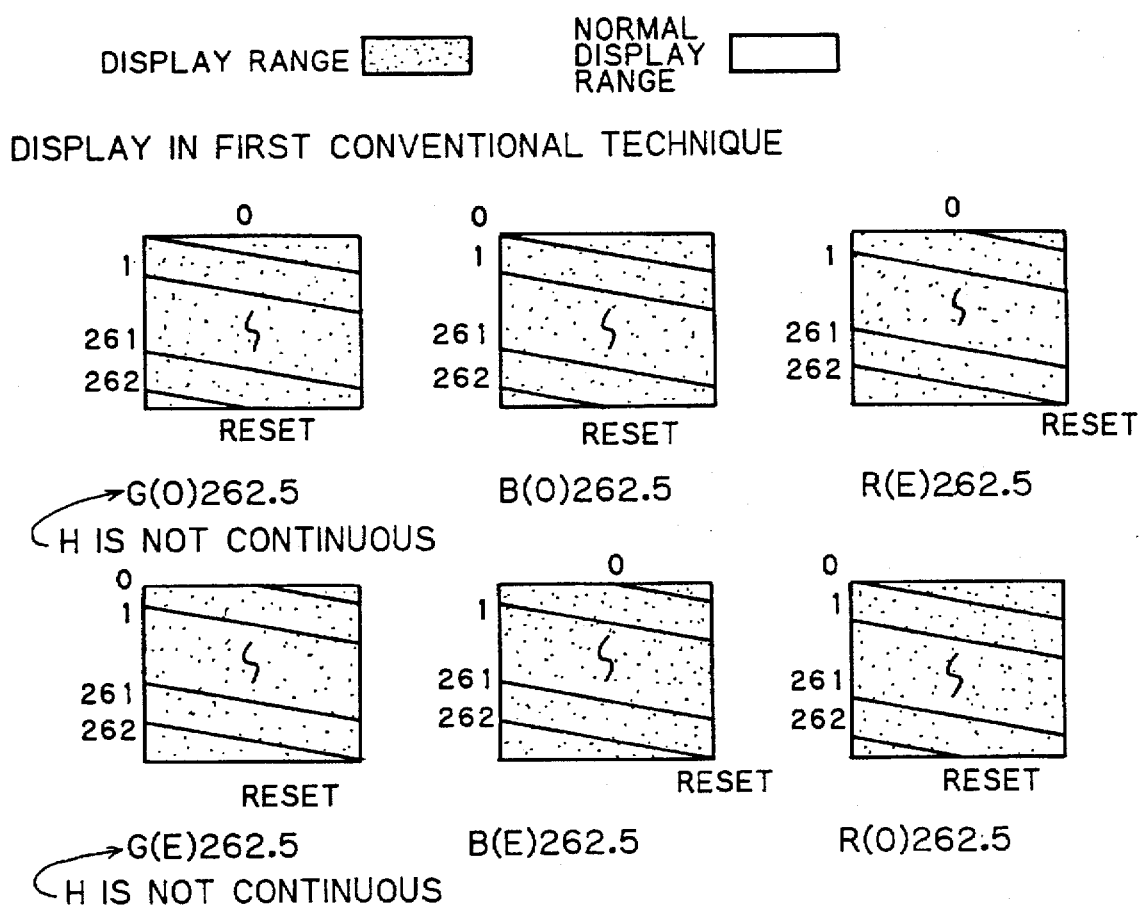
FIG. 28 is an explanatory diagram regarding a position at which an image read from a memory is displayed and vertical scanning in the first conventional technique.
Figure 29:
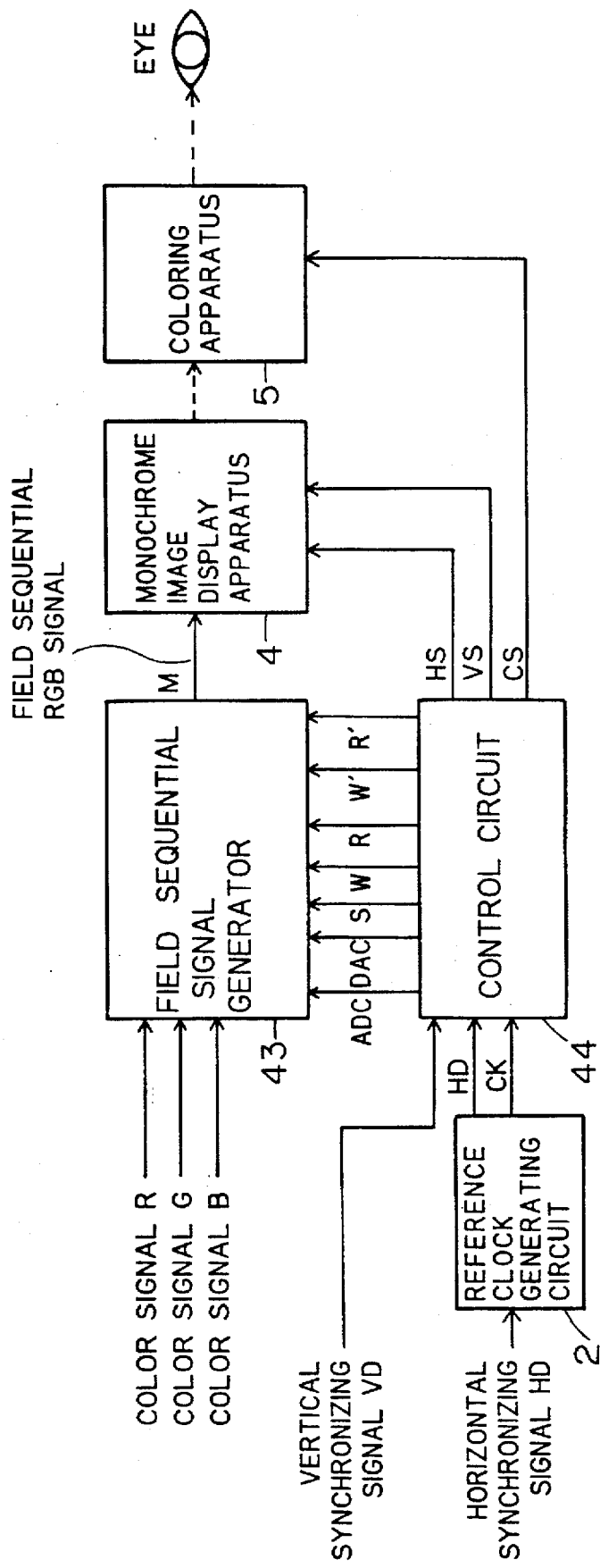
FIG. 29 is a schematic diagram showing a structure of a color image display apparatus which uses a field sequential signal according to a second conventional technique.
Figure 30:
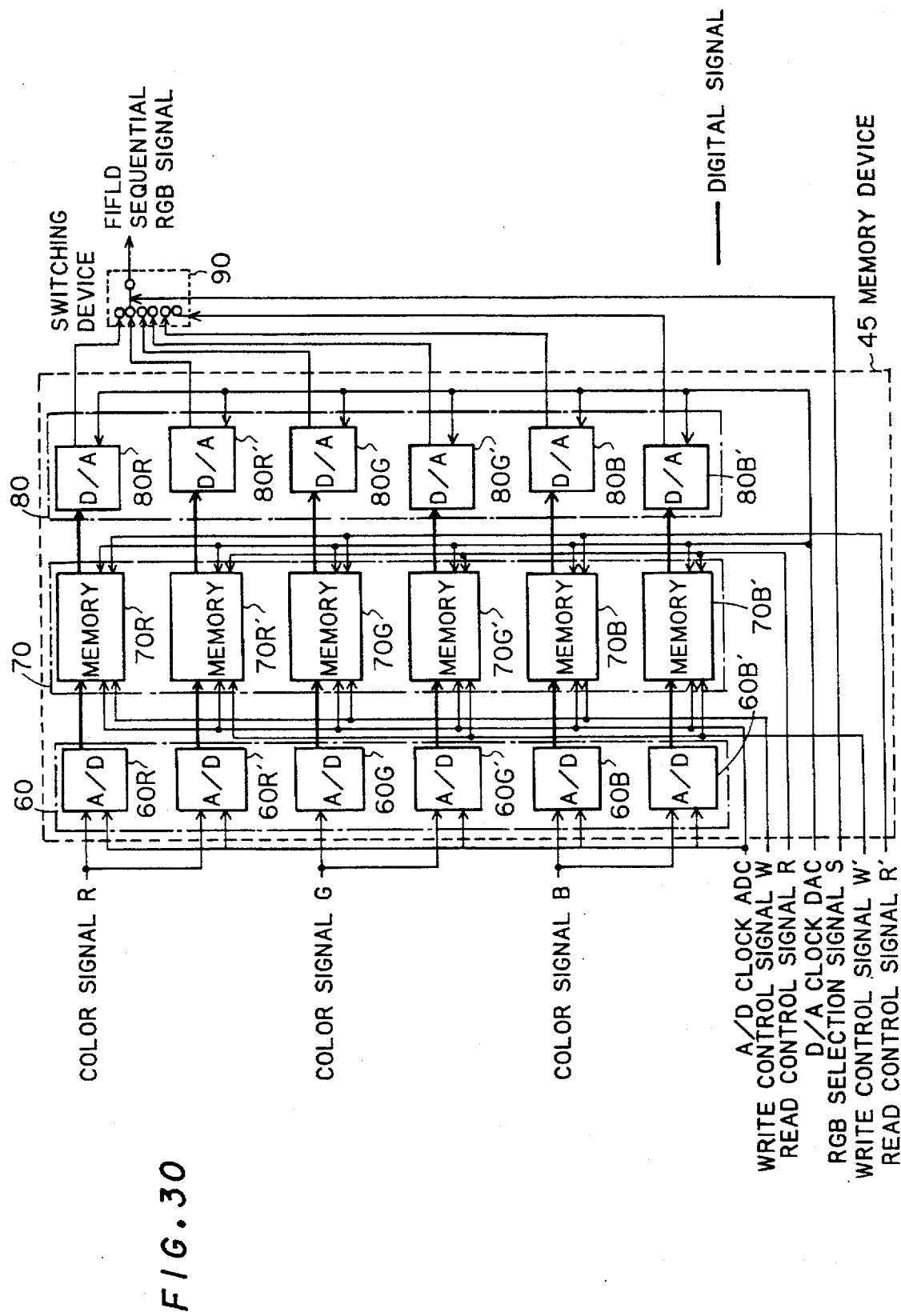
FIG. 30 is a view showing a structure of a field sequential signal generator used in the second conventional technique.
Figure 31:
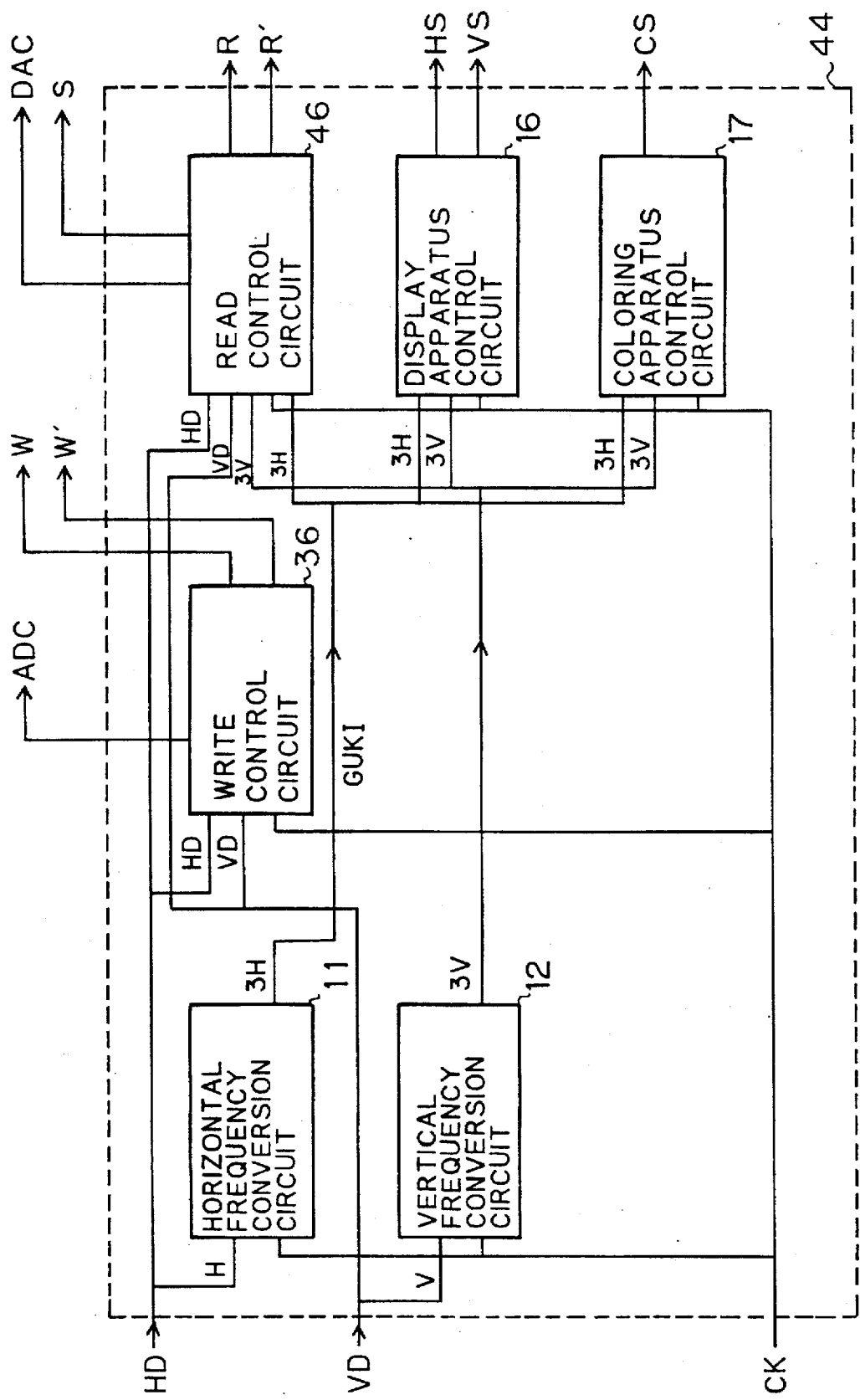
FIG. 31 is a view showing a structure of a control circuit used in the second conventional technique.
Figure 32A:
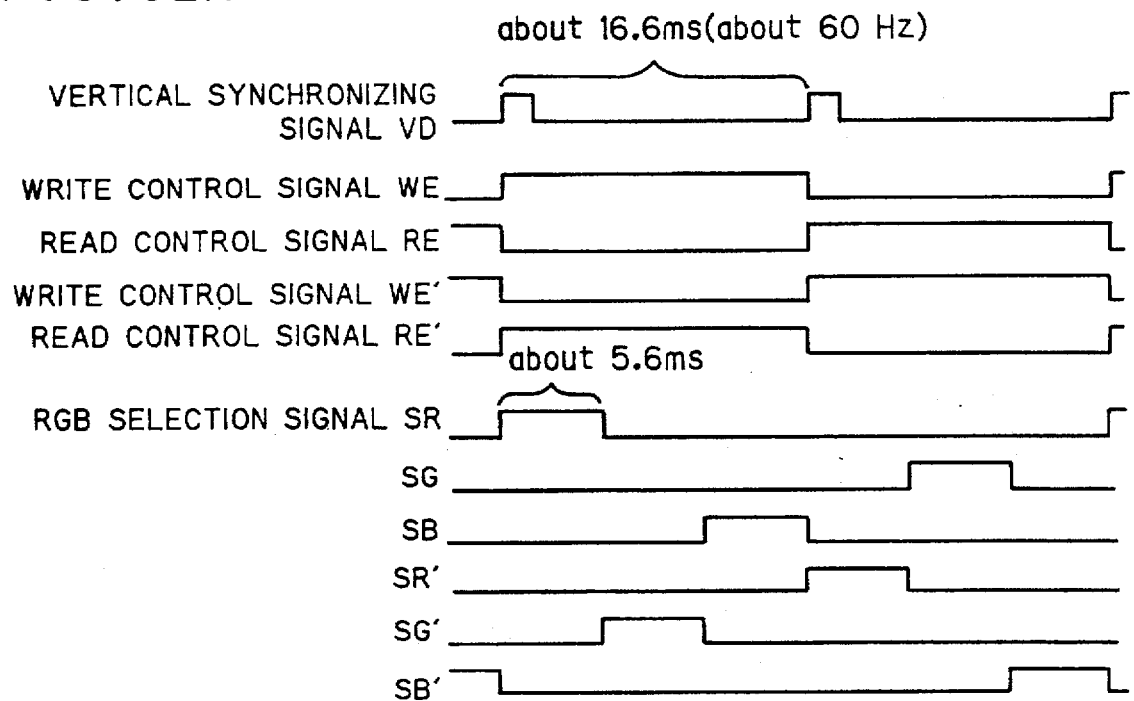
FIGS. 32A to 32C are explanatory diagrams regarding control signals used in the second conventional technique.
Figure 32B:
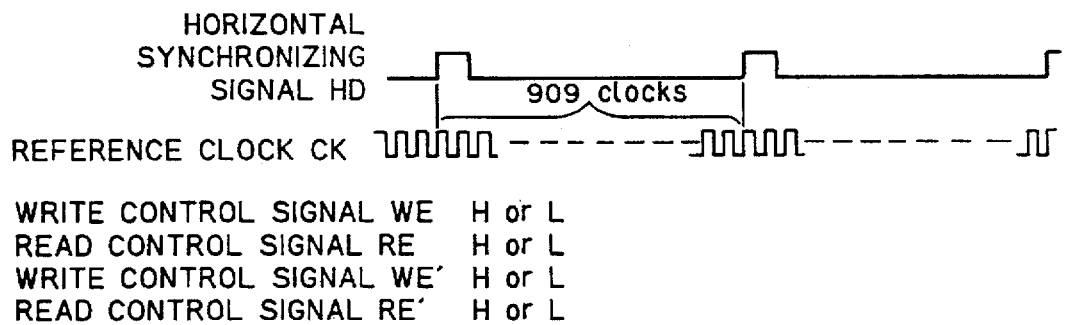
Figure 32C:
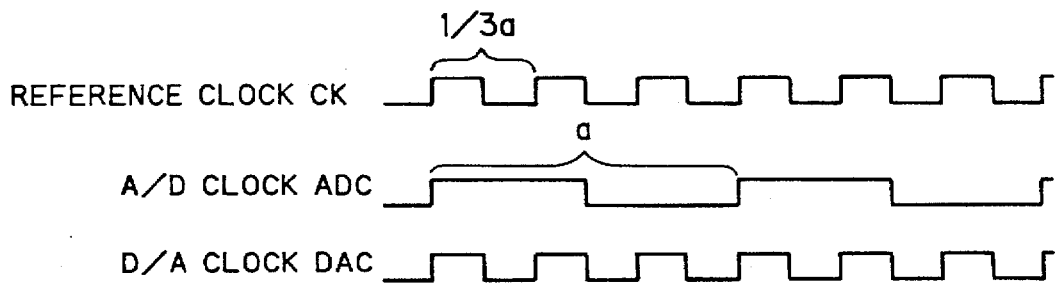

FIG. 17 is a view showing a structure of the reference clock generating circuit 34 which is used in the fifth preferred embodiment.

In FIG. 17, the reference clock generating circuit 34 is formed by the phase comparator 29, the voltage controlled oscillator (VCO) 30, the non-interlace VCO 31, the switching device 32 and the frequency conversion circuit 33.

A difference from the reference clock generating circuit 24 of the fourth preferred embodiment is that the reference clock generating circuit 34 outputs an output PLLH from the frequency conversion circuit 33. The drawings related to the fifth preferred embodiment are illustrated using the fourth preferred embodiment as an example. This is also the same with other preferred embodiments as well.

Now, an operation of the fifth preferred embodiment will be described.

In a color image display apparatus which uses a field sequential signal, the horizontal synchronizing signal HD is used within the control circuit and sampled by the reference clock to control the memories and etc.

However, since the reference clock is generated by the PLL which performs based on the horizontal synchronizing signal, the reference clock has jittering to a certain extent. Further, in general, since the horizontal synchronizing signal is obtained from an image signal by synchronized separation, the horizontal synchronizing signal has jittering to a certain extent.

Hence, when the horizontal synchronizing signal is sampled, the sampled horizontal synchronizing signal has two kinds of jittering with respect to the image signal, one inherent and the other created as a result of sampling.

Thus, the horizontal resolution is deteriorated or a picture is disturbed due to jittering in the conventional techniques.

As shown in FIGS. 16 and 17, the fifth preferred embodiment requires that the reference clock generating circuit 34 outputs the horizontal synchronizing comparison output PLLH from the frequency conversion circuit 33 and that the output PLLH is used as a reference signal for horizontal control instead of the horizontal synchronizing signal HD.

The horizontal synchronizing signal is used as a signal for controlling the memories and the like within the control circuit. The control circuit 25 is formed by a logic circuit. The horizontal synchronizing signal is sampled by the reference clock to become a horizontal control reference signal.

When the horizontal synchronizing signal includes jittering, the horizontal synchronizing signal is sampled by the reference clock at a position one clock ahead or behind.

The reference clock as well includes jittering to a certain extent due to jittering of the horizontal synchronizing signal, and therefore, jittering of the reference clock becomes larger due to synergy.

If the horizontal synchronizing signal changes largely, the change directly becomes a change in the reference signal.

To deal with this, the frequency conversion circuit processes the reference clock so that the output PLLH which has the same cycle as that of the horizontal synchronizing signal is used as the reference clock for the control circuit.

Since the horizontal synchronizing signal is sampled by the frequency conversion circuit in advance, it is not necessary to sample the horizontal synchronizing signal within the control circuit. Hence, only the jittering of the reference clock is present.

Further, since the reference clock has a certain time constant created by PLL with the horizontal synchronizing signal, even if the horizontal synchronizing signal largely changes, the reference clock changes only moderately.

Thus, in the fifth preferred embodiment, instead of the horizontal synchronizing signal, a stable horizontal reference signal which does not have jittering is continuously obtained by frequency-dividing the reference clock. Hence, it is possible to construct a color image display apparatus using a field sequential signal which displays a stable picture at a high horizontal resolution even when receiving a signal with which horizontal synchronization is easily disturbed such as a video reproduction signal and a speed search signal.

While the invention has been described in detail, the foregoing description is in all aspects illustrative and not restrictive. It is understood that numerous other modifications and variations can be devised without departing from the scope of the invention.

We claim:

1. A color image display apparatus, comprising:

field sequential signal generating means including a memory device for storing one field of each one of a plurality of primary color signals which form a color image signal, said field sequential signal generating means receiving the plurality of primary color signals and reading the plurality of primary color signals which are stored in said memory device at a speed which is n times faster than a speed at which the plurality of primary color signals are stored in said memory device to convert the plurality of primary color signals into a field sequential signal;

image displaying means for sequentially displaying the field sequential signal which is output from said field sequential signal generating means;

coloring means, disposed to face a display screen of said image displaying means, in synchronization with the field sequential signal which is sequentially displayed by said image displaying means, said coloring means coloring the field sequential signal in a color which corresponds to each one of the plurality of primary color signals which form the field sequential signal;

reference clock generating means for generating a reference clock signal having a predetermined frequency in accordance with a horizontal synchronizing signal of the color image signal; and control means for controlling said field sequential signal generating means, said image displaying means and said coloring means in accordance with the horizontal synchronizing signal of the color image signal and a vertical synchronizing signal of the color image signal and in accordance with the reference clock signal which is outputted from said reference clock generating means so that said field sequential signal generating means, said image displaying means and said coloring means each operate at predetermined timing, wherein said control means controls said field sequential signal generating means so that a horizontal synchronizing signal of the field sequential signal which is outputted from said field sequential signal generating means, appears continuously in a constant cycle.

2. The color image display apparatus of claim 1, wherein said control means includes, a field judging circuit which receives the horizontal synchronizing signal of the color image signal and the vertical synchronizing signal of the color image signal and judges whether a field of the color image signal stored in said memory device of said field sequential signal generating means is an even-numbered field or an odd-numbered field in accordance with the horizontal synchronizing signal of the color image signal and the vertical synchronizing signal of the color image signal, and said control means controls said field sequential signal generating means in accordance with a field judging result produced by said field judging circuit so that the horizontal synchronizing signal of the field sequential signal appears continuously in a constant cycle.

3. The color image display apparatus of claim 2, wherein said field judging circuit judges a phase difference between the horizontal synchronizing signal of the color image signal and the vertical synchronizing signal of the color image signal to determine whether the field of said color image signal is an even-numbered field or an odd-numbered field.

4. A color image display apparatus, comprising:

field sequential signal generating means including a memory device for storing one field of each one of a plurality of primary color signals which form a color image signal, said field sequential signal generating means receiving the plurality of primary color signals and reading the plurality of primary color signals which are stored in said memory device at a speed which is n times faster than a speed at which the plurality of primary color signals are stored in said memory device to convert the plurality of primary color signals into a field sequential signal;

image displaying means for sequentially displaying the field sequential signal which is output from said field sequential signal generating means;

coloring means, disposed to face a display screen of said image displaying means, in synchronization with the field sequential signal which is sequentially displayed by said image displaying means, said coloring means coloring the field sequential signal in a color which corresponds to each one of the plurality of primary color signals which form the field sequential signal;

reference clock generating means for generating a reference clock signal having a predetermined frequency in accordance with a horizontal synchronizing signal of the color image signal; and control means for controlling said field sequential signal generating means, said image displaying means and said coloring means in accordance with the horizontal synchronizing signal of the color image signal and a vertical synchronizing signal of the color image signal and in accordance with the reference clock signal which is outputted from said reference clock generating means so that said field sequential signal generating means, said image displaying means and said coloring means each operate at predetermined timing, wherein said control means controls said field sequential signal generating means so that a horizontal synchronizing signal of the field sequential signal which is outputted from said field sequential signal generating means, appears continuously in a constant cycle, wherein said control means includes a memory which allots certain addresses to one line of a horizontal direction in advance, moves an address to a next predetermined address value in synchronization with the horizontal synchronizing signal of the color image signal even if the address is in the middle of a line and resets a memory address in synchronization with the vertical synchronizing signal of the color image signal, and therefore said memory can read and write at the same time.

5. The color image display apparatus to claim 1, wherein the plurality of primary color signals which are supplied to said field sequential signal generating means are primary color signals of three primary colors of red, green and blue, and said number n is three.

6. The color image display apparatus of claim 2, wherein said control means controls horizontal scanning by said image displaying means so that said image displaying means scans in a certain cycle of a speed n times faster and said control means controls a vertical scanning position on said image displaying means in accordance with the field judging result produced by said field judging circuit so that a field of the field sequential signal which is displayed by said image displaying means coincides with a field of the color image signal stored in said memory device.

7. The color image display apparatus of claim 6, wherein said control means synchronizes a vertical scanning period of said image displaying means with the horizontal synchronizing signal of the color image signal having a speed n or n/2 times faster for each field in accordance with the field judging result by said field judging circuit, whereby a field the field sequential signal which is displayed by said image displaying means coincides with a field of the color image signal which is stored in said memory device.

8. The color image display apparatus of claim 7, wherein said control means synchronizes a vertical scanning period of said image displaying means with the horizontal synchronizing signal of the color image signal having a speed n or n/2 times faster for each field in accordance with the field judging result produced by said field judging circuit, whereby a field and a vertical scanning position of the field sequential signal which is displayed by said image displaying means coincide with a field and a vertical scanning position of the color image signal which is stored in said memory device, respectively.

9. The color image display apparatus of claim 8, wherein when the color image signal is an NTSC signal, said control means controls said image displaying means so that the vertical scanning period of the image displaying means has a width of 263, 262.5, 263,262, 262.5 and 262 where 1 is a horizontal period of n times faster as measured from a point where an odd-numbered field changes to an even-numbered field.

10. The color image display apparatus of claim 1, wherein said control means includes a non-interlace judging circuit which judges whether the plurality of primary color signals which are supplied to the field sequential signal generating means are interlace signals or non-interlace signals, and said control means synchronizes vertical scanning timing of said image displaying means with the horizontal synchronizing signal of the color image signal when the plurality of primary color signals which are supplied to said field sequential signal generating means are non-interlace signals so that interlacing is not performed.

11. The color image display apparatus of claim 10, wherein said control means controls said reference clock generating means so that said reference clock generating means outputs a non-interlace reference clock signal which corresponds to the non-interlace signals when said non-interlace judging circuit detects the non-interlace signals.

12. The color image display apparatus of claim 1, wherein said reference clock generating means provides said control means with a horizontal reference signal for comparing frequency-converted horizontal synchronizing phases instead of supplying the horizontal synchronizing signal of the color image signal to said control means.

* * * * *